(12) United States Patent
Mikos et al.

(10) Patent No.: US 8,349,982 B2
(45) Date of Patent: Jan. 8, 2013

(54) MACROMONOMERS AND HYDROGELS

(75) Inventors: Antonios G. Mikos, Houston, TX (US); Michael C. Hacker, Leipzig (DE)

(73) Assignee: William Marsh Rice University, Houston, TX (US)

( * ) Notice: Subject to any disclaimer, the term of this patent is extended or adjusted under 35 U.S.C. 154(b) by 691 days.

(21) Appl. No.: 12/259,107

(22) Filed: Oct. 27, 2008

(65) Prior Publication Data

US 2009/0111928 A1   Apr. 30, 2009

Related U.S. Application Data

(63) Continuation-in-part of application No. PCT/US2007/067391, filed on Apr. 25, 2007.

(60) Provisional application No. 60/745,595, filed on Apr. 25, 2006.

(51) Int. Cl.
*C08F 118/02* (2006.01)
*C08F 18/02* (2006.01)
*C08F 20/26* (2006.01)
*C08F 22/14* (2006.01)
*C08G 63/00* (2006.01)
*C08G 61/12* (2006.01)

(52) U.S. Cl. ........ 526/321; 526/319; 526/320; 528/271; 528/272; 528/392

(58) Field of Classification Search ................... 526/319, 526/320, 321; 528/271, 272, 392
See application file for complete search history.

(56) References Cited

U.S. PATENT DOCUMENTS

| 5,418,301 | A | 5/1995 | Hult et al. | |
|---|---|---|---|---|
| 5,478,894 | A | 12/1995 | Chiang et al. | |
| 2001/0056301 | A1* | 12/2001 | Goupil et al. | 623/11.11 |
| 2003/0180348 | A1* | 9/2003 | Levinson et al. | 424/450 |
| 2005/0238722 | A1* | 10/2005 | Pathak et al. | 424/486 |

OTHER PUBLICATIONS

Kuo, et al. Ionically Crosslinked Alginate Hydrogels as Scaffolds for Tissue Engineering: Part 1, Struture Gelation rate and Mechanical Properties. Biomaterials Mar. 15, 2001; 22(6): 511-521. Abstract Only.
International Preliminary Report on Patentability; PCT/US2007/067391; pp. 7, Nov. 6, 2008.

* cited by examiner

*Primary Examiner* — Karuna P Reddy
(74) *Attorney, Agent, or Firm* — Baker Botts L.L.P.

(57) ABSTRACT

Macromonomers capable of both physical crosslinking and chemical crosslinking. The combination of chemical crosslinking and physical crosslinking provides the ability to generate rapidly gelling hydrogels for many different applications. Moreover, the macromonomers may incorporate functional groups that allow for two different gelation mechanisms—thermal gelation and ionic gelation—further improving mechanical stability of hydrogels formed from the disclosed macromonomers.

47 Claims, 12 Drawing Sheets

US 8,349,982 B2

MACROMONOMERS AND HYDROGELS

CROSS-REFERENCE TO RELATED APPLICATIONS

This application is a continuation-in-part of International Application No. PCT/US2007/67391, filed Apr. 25, 2007, which claims the benefit of U.S. Provisional Application Ser. No. 60/745,595, filed Apr. 25, 2006, both of which are incorporated in this application by reference.

STATEMENT OF GOVERNMENT INTEREST

This invention was made with government support under Grant Number R01 DE15164 awarded by the National Institutes of Health and Grant Number HA 4444/1-1 awarded by the Deutsche Forschungsgemeinschaft DFG. The government has certain rights in the invention.

BACKGROUND

One of the primary problems facing researchers and clinicians in the broad field of tissue engineering and regenerative medicine is the fabrication of biomaterial substrates that provide appropriate three-dimensional architecture, mechanical support, and the ability to deliver both cells and growth factors tailored to a specific tissue of interest. In situ gel formation is a concept of great interest for tissue engineers as it enables the delivery of a hydrogel matrix encapsulating cells and growth factors to defects of any shape using minimally invasive surgical techniques.

Smart polymers, polymeric materials that respond to environmental stimuli, have become attractive materials in biotechnology and medicine. In response to small changes in the environment, such polymers undergo strong conformational changes that result in rapid desolvation of the polymer molecules and phase separation of the solution. Functional groups have been identified and polymers synthesized that respond to a variety of stimuli, including changes in temperature, pH, osmotic pressure, ionic strength, pressure, and electric or magnetic field. Temperature-sensitive hydrogel-forming polymers are one of the most common among these materials and have been previously studied as temperature-regulated drug delivery systems and have also been investigated as matrices for injectable tissue engineering applications. In situ gel formation is a concept of great interest for tissue engineers as it enables the delivery of a hydrogel matrix encapsulating cells and/or growth factors to defects of any shape using minimally invasive surgical techniques. Various natural and synthetic polymers have been modified chemically with moieties for chemical crosslinking, including acrylic esters, methacrylic esters, cinnamoyl esters, fumaric esters, and vinyl sulfone, to yield injectable biodegradable matrices. In situ gel formation by radical polymerization of the electron-poor olefins can be induced photochemically or thermally without harming encapsulated cells. However, only low concentrations of radical initiators and crosslinking agents are tolerated by encapsulated cells in thermally induced crosslinking reactions, and thus, certain important parameters such as gelation kinetics, crosslinking densities, and resulting mechanical properties of the hydrogels can only be varied to a limited extent without compromising the cytocompatibility of the process. Photocrosslinking, on the other hand, requires accessibility of the defect for a light source and hydrogel dimensions are limited to ensure homogenous polymerization. Irradiation times and doses also have to be carefully controlled to avoid detrimental effects of the curing light on cells or tissues.

During the fabrication of hydrogels or polymer networks by chemical crosslinking, certain important parameters such as gelation kinetics, crosslinking densities and resulting mechanical properties of the hydrogels can only be varied to a limited extent without compromising the cytocompatibility of the process. Cytocompatible chemical gelation methods, for instance, typically yield firm hydrogels after several minutes, while thermally induced gelation of thermo-sensitive polymer solutions occurs almost instantaneously once a certain temperature is reached.

DRAWINGS

Some specific example embodiments of the disclosure may be understood by referring, in part, to the examples following and the accompanying drawings.

Figure 3:
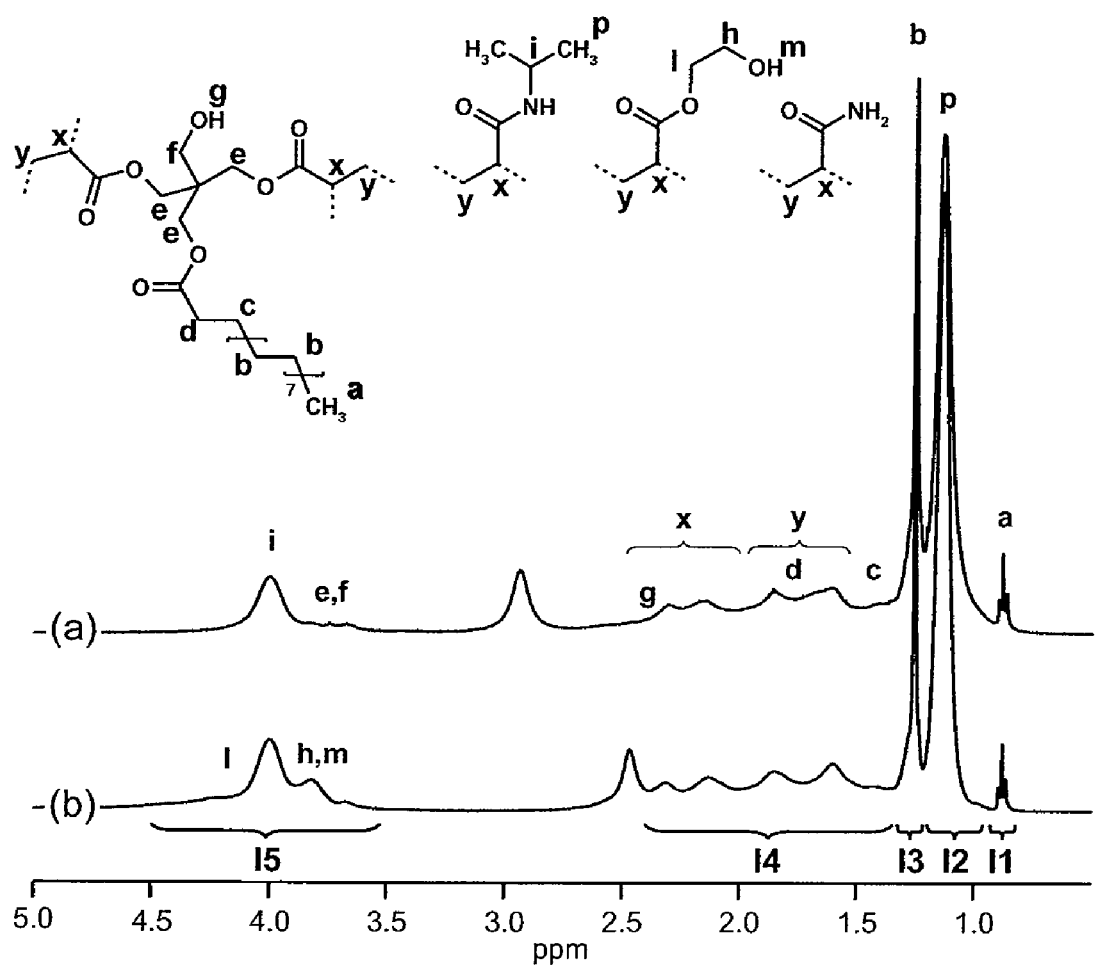
Figure 4:
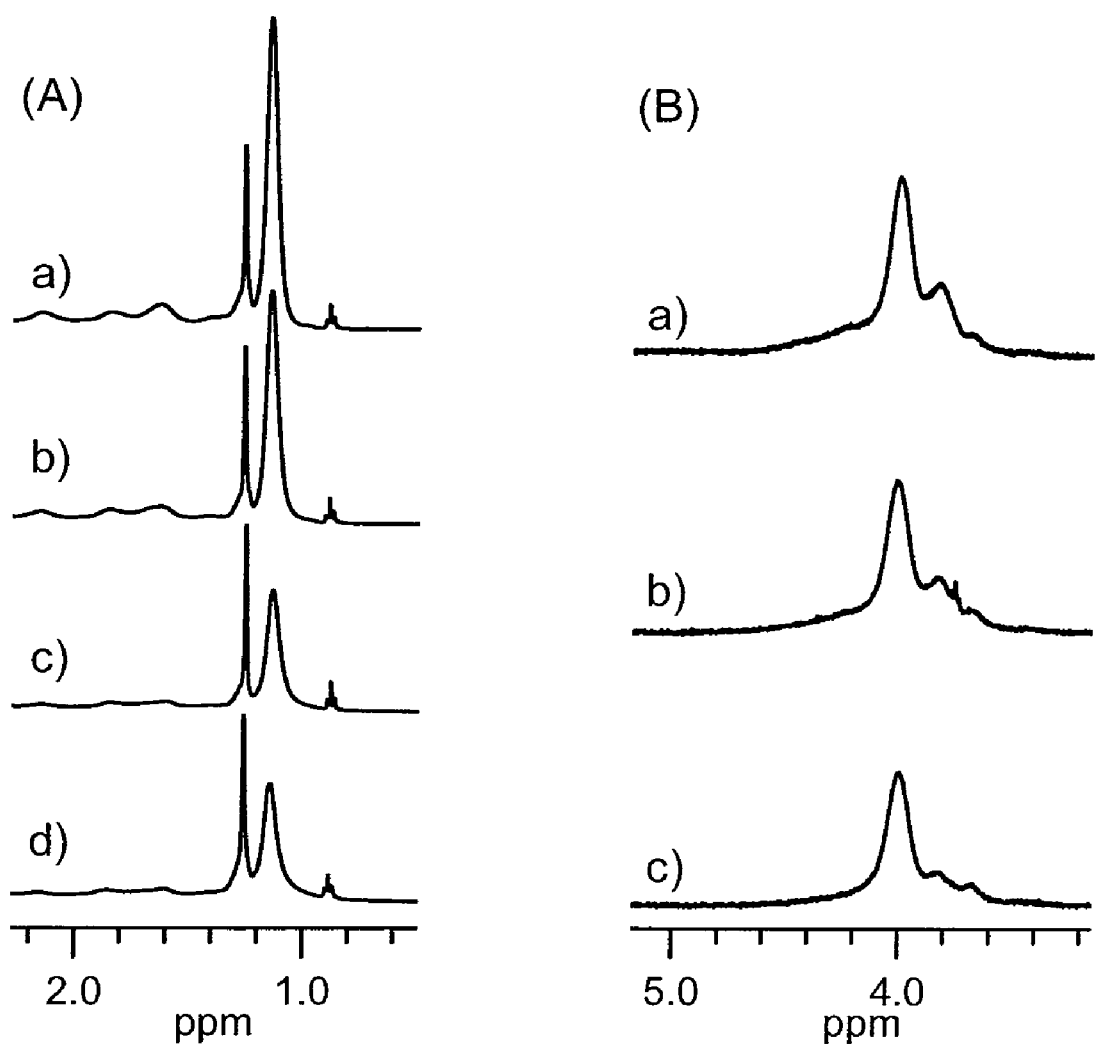
Figure 5:
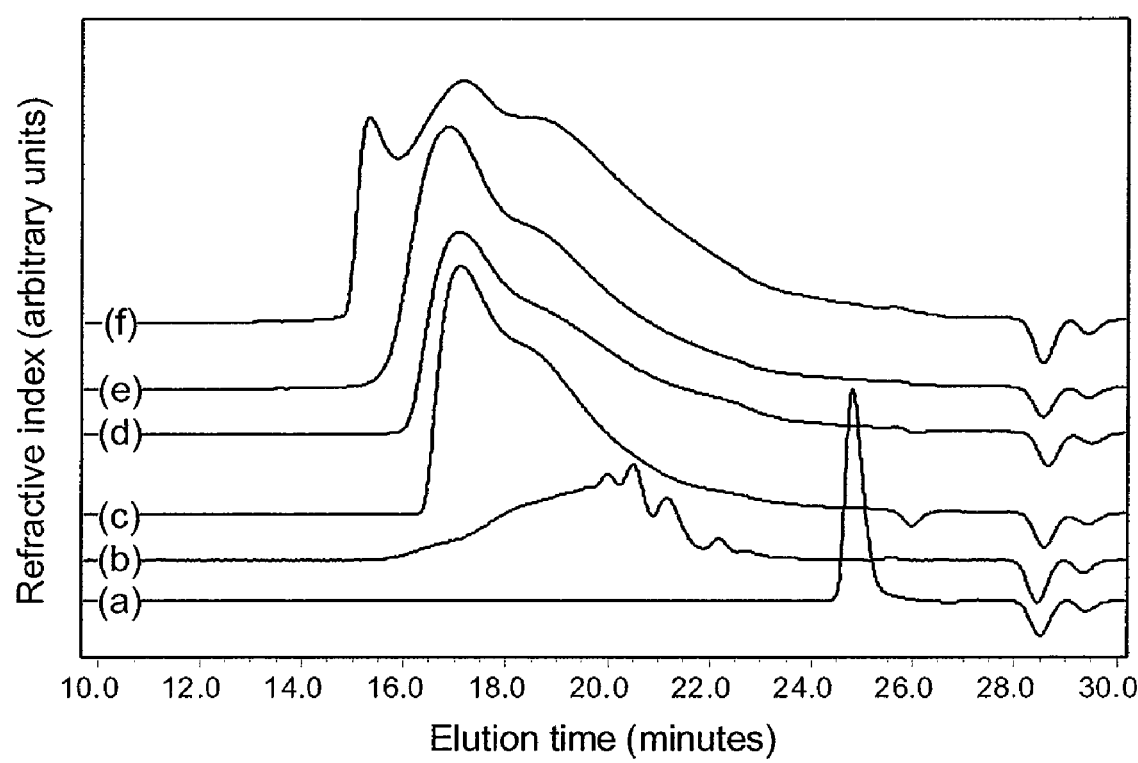
Figure 7:
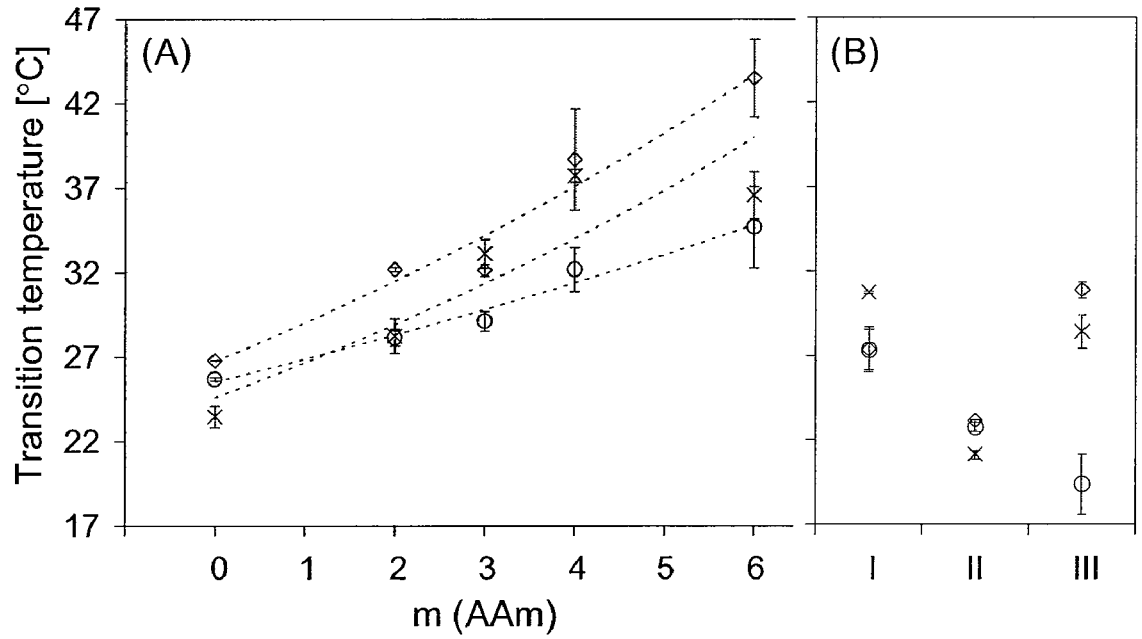
Figure 7:
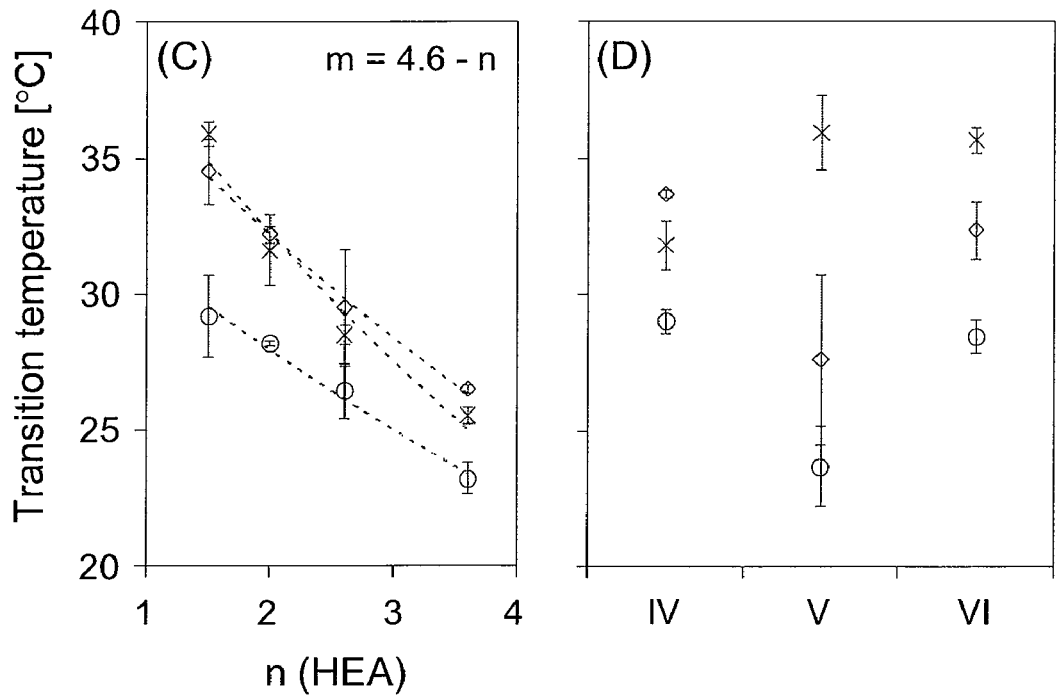
Figure 8:
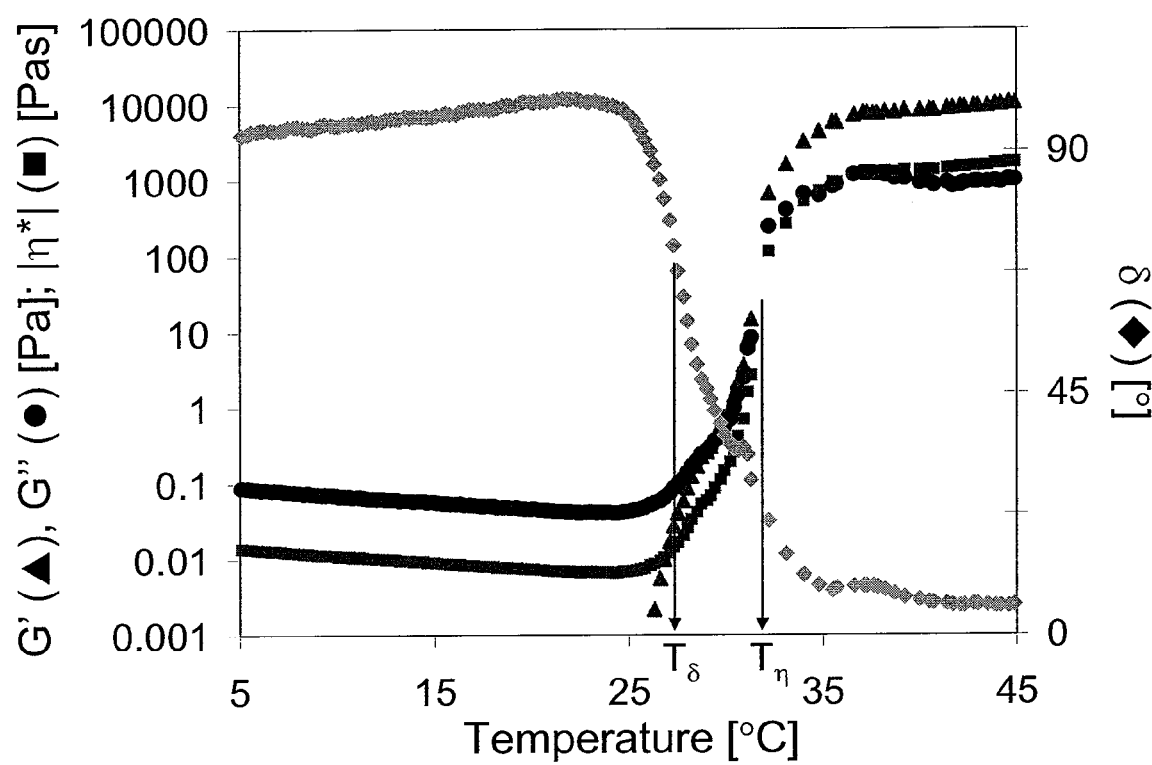
Figure 9:
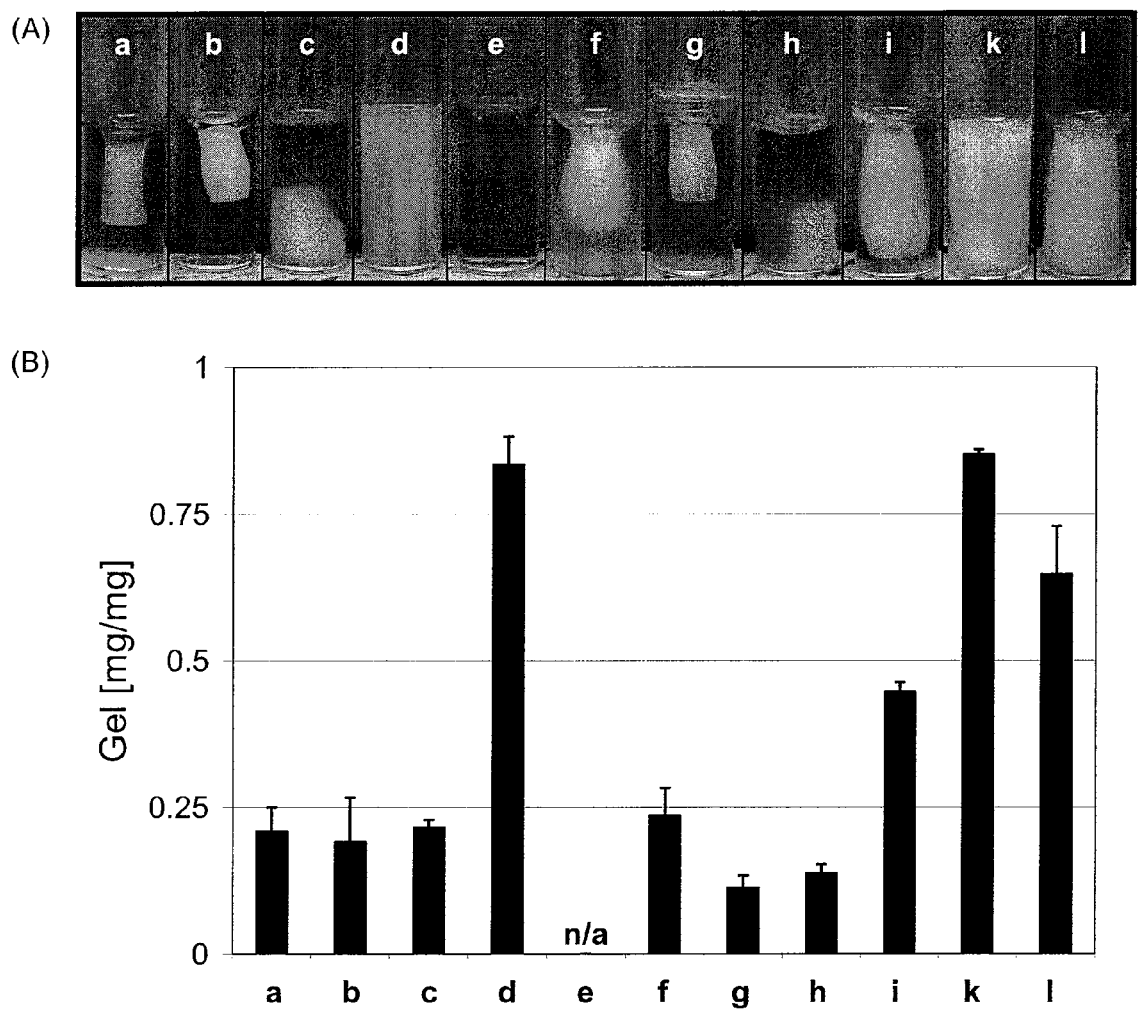

FIG. 3 illustrates a $^1$H-NMR spectrum of (a) poly(PEDAS-stat-NiPAAm$_{16}$-stat-AAm$_4$) and (b) poly(PEDAS-stat-NiPAAm$_{16}$-stat-HEA$_4$). Stat denotes statistical polymers and subscript numbers indicate theoretical comonomer ratios. The letters assigned to the peaks correspond to the protons at the positions labeled in the structural elements of the copolymers. I1-I5 represent the integrals used to determine macromer composition;

FIG. 4 illustrates close-ups of the $^1$H-NMR spectra for different TGMs illustrating qualitative changes in signal intensities with changing comonomer ratios. (A) poly(PEDAS$_1$-stat-NiPAAm$_{(20-m)}$-stat-AAm$_m$ with m=0, 2, 4, 6 (a-d) and (B) poly(PEDAS$_1$-stat-NiPAAm$_{(20-m-n)}$-stat-HEA$_n$) with m/n=1/3.6 (a), 2/2.6 (b), 3/1.6 (c);

FIG. 5 illustrates GPC traces of (a) NiPAAm, (b) PEDAS, (c) poly(octadecyl acrylate) (ODA)$_1$-stat-NiPAAm$_{15.4}$-stat-AAm$_3$-stat-HEA$_{1.6}$), (d) poly(PEDAS$_1$-stat-NiPAAm$_{15.4}$-stat-AAm$_3$-stat-HEA$_{1.6}$), (e) poly(PEDAS$_1$-stat-NiPAAm$_{14}$-stat-AAm$_4$), (f) poly(PEDAS$_1$-stat-NiPAAm$_{14}$-stat-AAm$_6$) (Subscript numbers indicate theoretical comonomer ratios);

FIG. 6(A) shows representative rheograms of a thermogelling macromonomer and polyNiPAAm as recorded during a test for reversibility of the thermogelation;

FIG. 6(B) is a plot of values for complex viscosity |η*| (left y-axis) for PNiPAAm, poly(PEDAS$_1$-stat-NiPAAm$_{14}$-stat-AAm$_3$-stat-HEA$_3$) and poly(PEDAS$_1$-stat-NiPAAm$_{15.4}$-stat-AAm$_2$-stat-HEA$_{2.6}$) as determined at 15° C. during step I (15° C.), after 2 min at 37° C., and after 60' into step IV at 15° C. Transition temperatures as determined by DSC ($T_{DSC}$) of the different polymers are assigned to the right y-axis. Columns and error bar represent means+standard deviation for n=3;

FIG. 7 shows phase transition temperatures determined from rheology ($T_s$:○, $T_n$:◇) and differential scanning calorimetry ($T_{DSC}$:X) for different TGMs. (A) Co- and terpolymers composed of PEDAS, NiPAAm and different contents of AAm (m=0-6). (B) Polymeric controls: (I) PNiPAAm, (II) poly(PEDAS$_1$-stat-NiPAAm$_{16}$-stat-HEA$_4$) and (III) poly(ODA$_1$-stat-NiPAAm$_{15.4}$-stat-AAm$_3$-stat-HEA$_{1.6}$). (C) Poly(PEDAS$_1$-stat-NiPAAm$_{15.4}$-stat-AAm$_{(4.6-n)}$-stat-HEA$_n$) with different contents of HEA (n=1.6, 2, 2.6, 3.6) (D) TGMs with different NiPAAm:AAm:HEA comonomer ratios, (IV) 14:3:3, (V) 13:4:3, (VI) 15:3.5:1.5. Error bars stand for means±standard deviation for n=3;

FIG. 8 shows a representative rheogram of poly(PEDAS$_1$-stat-NiPAAm$_{15}$-stat-AAm$_{3.5}$-stat-HEA$_{1.5}$) obtained during a temperature sweep between 5 and 45° C. at 1 Hz.;

FIG. 9 is an image depicting the stability of thermogels of different comonomer composition at 37° C. (A) Includes macroscopic images of thermogels after 2 h of incubation. (B) shows the mass fraction of thermogels after 2 h. Columns and error bars represent means±standard deviation for n=3. Samples: (a) PNiPAAm; poly(PEDAS$_1$-stat-NiPAAm$_{(20-m)}$-stat-AAm$_m$) with m=0, 3, 4, 6 (b-e); poly(PEDAS$_1$-stat-NiPAAm$_{(20-m-n)}$-stat-AAm$_m$-stat-HEA$_n$) with m/n=2/2.6 (f), 1/3.6 (g), 0/4 (h), 3/3 (i), 3.5/3 (k), and 3.5/1.5 (l).

Figure 10:
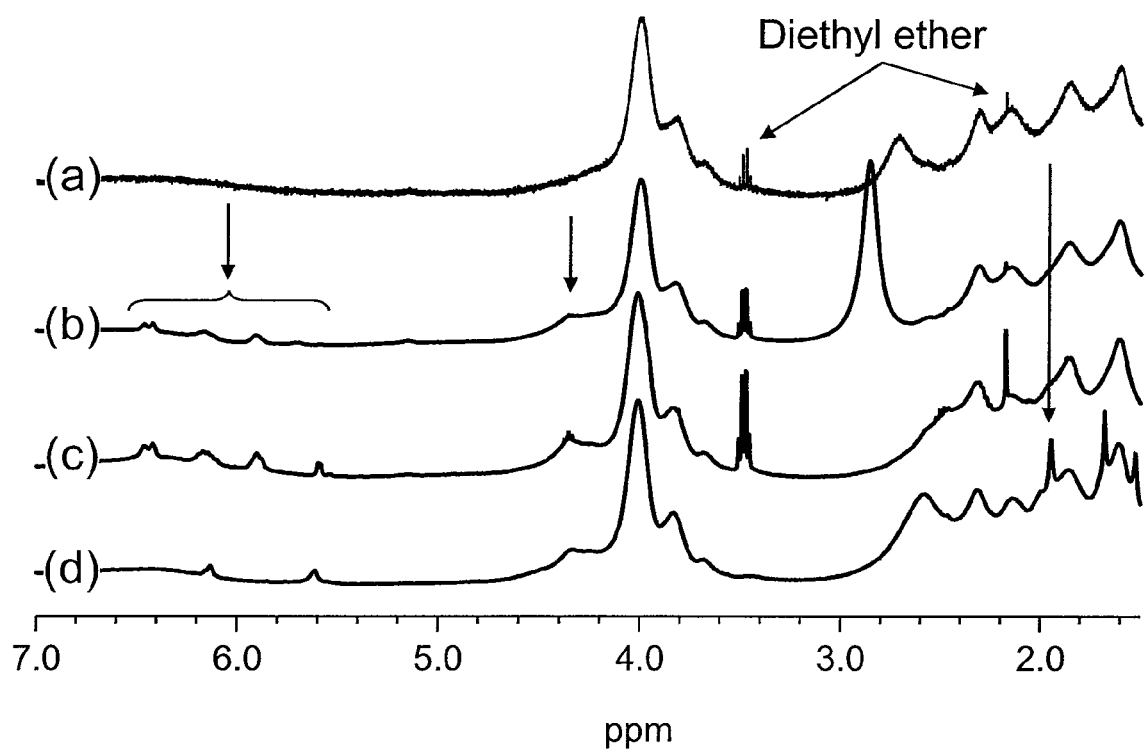

FIG. 10 illustrates close ups (1.5-7 ppm) of $^1$H-NMR spectra obtained for (a) poly(PEDAS$_1$-stat-NiPAAm$_{14}$-stat-AAm$_3$-stat-HEA$_3$)(TGM) and (b-d) (meth)acrylated poly(PEDAS$_1$-stat-NiPAAm$_{14}$-stat-AAm$_3$-stat-HEA$_3$) at different molar excesses of (meth)acryloyl chloride: (b) TGM-Ac (0.75×), (c) TGM-Ac (2.5×), and (d) TGM-MA (2.5×). Proton signals derived from the (meth)acrylate esters are indicated by arrows.

Figure 11:
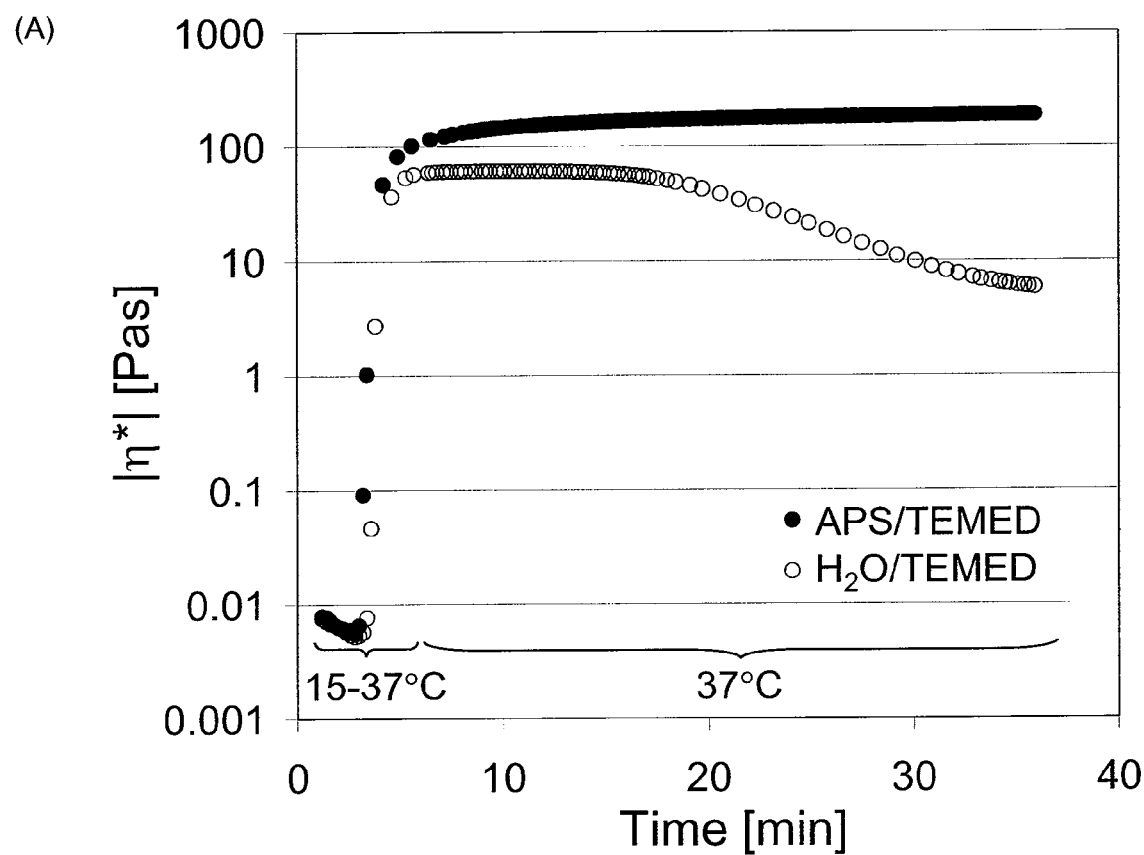
Figure 11:
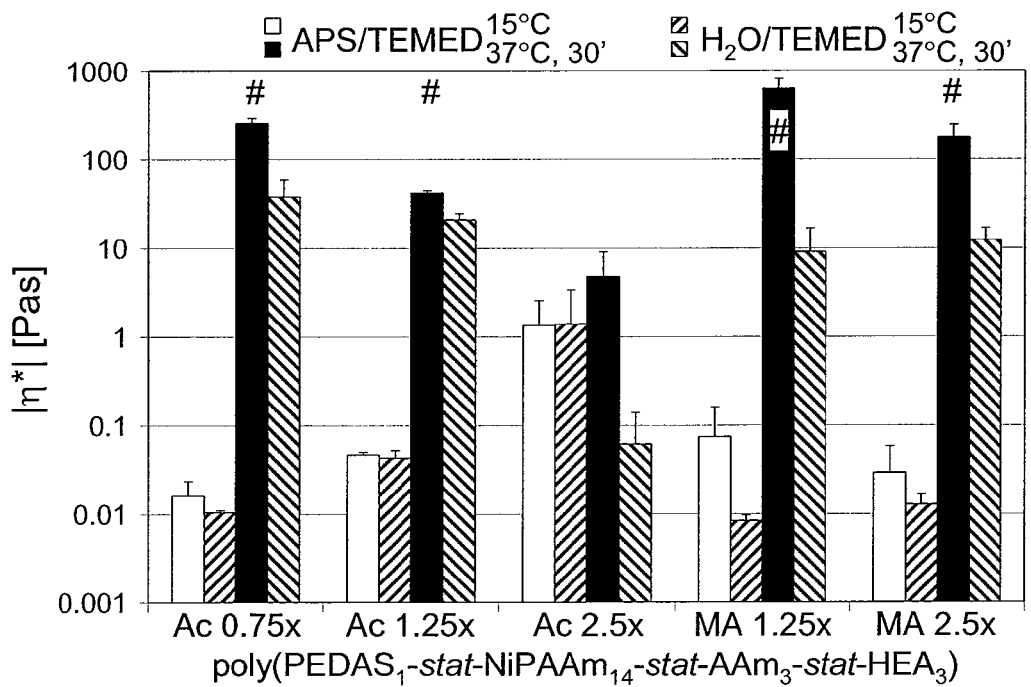
Figure 11:
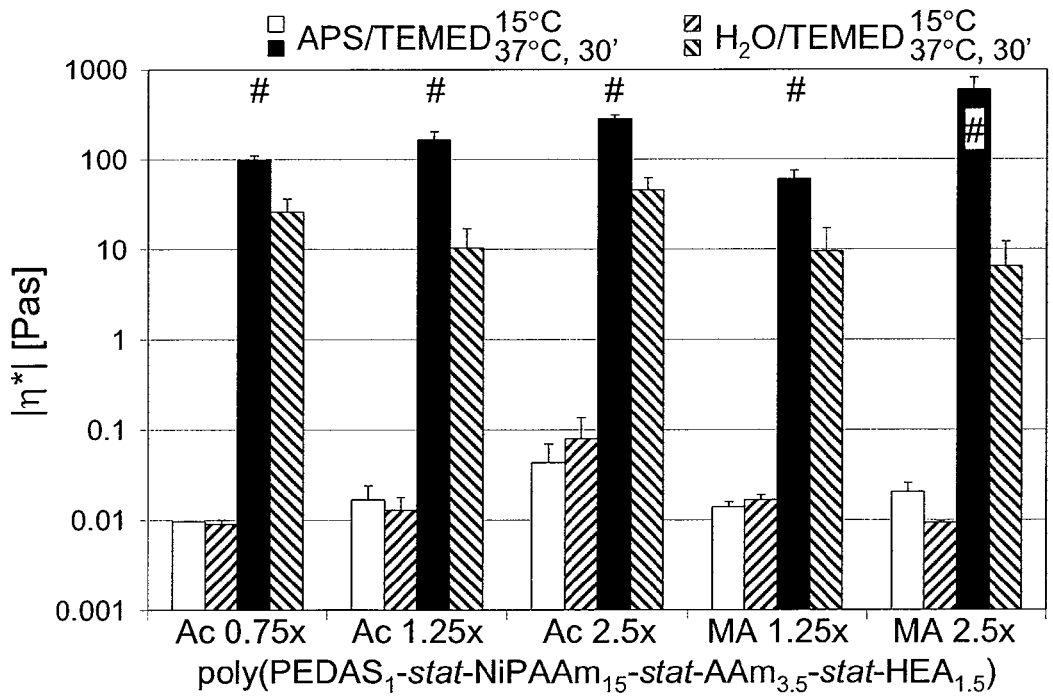

FIG. 11 is a rheological characterization of solutions of different (meth)acrylated TGMs with (APS/TEMED) and without (H$_2$O/TEMED) chemical initiation. (A) Representative rheograms of acrylated (0.75×) poly(PEDAS$_1$-stat-NiPAAm$_{15}$-stat-AAm$_{3.5}$-stat-HEA$_{1.5}$) (10%, m/v) with and without chemical initiation during the combined temperature-time experiment. Complex viscosity |η*| at 15° C. and after 30 min at 37° C., as determined for macromer solutions of (A) different (meth)acrylated poly(PEDAS$_1$-stat-NiPAAm$_{14}$-stat-AAm$_3$-stat-HEA$_3$) and (B) different (meth)acrylated poly(PEDAS$_1$-stat-NiPAAm$_{15}$-stat-AAm$_{3.5}$-stat-HEA$_{1.5}$) with (APS/TEMED) and without (H$_2$O/TEMED) chemical initiation. Columns and error bars represent means+standard deviation for n=3. A statistically significantly increased complex viscosity for the APS/TEMED samples after 30 min at 37° C. as compared to the H$_2$O/TEMED samples at the same time point is denoted by #.

While the present disclosure is susceptible to various modifications and alternative forms, specific example embodiments have been shown in the figures and are herein described in more detail. It should be understood, however, that the description of specific example embodiments is not intended to limit the invention to the particular forms disclosed, but on the contrary, this disclosure is to cover all modifications and equivalents as illustrated, in part, by the appended claims.

DESCRIPTION

In general, the present disclosure provides, according to certain embodiments, amphiphilic macromonomers that are capable of both physical crosslinking and chemical crosslinking and that contain biocompatible hydrophobic domains. The combination of chemical crosslinking and physical crosslinking provides the ability to generate rapidly gelling hydrogels for many different applications. Moreover, the macromonomers may incorporate functional groups that allow for two different gelation mechanisms, for example, thermal gelation and ionic gelation, further improving mechanical stability of hydrogels formed from the macromonomers described in the present disclosure. The macromonomers also may incorporate hydrophobic domains for mechanical reinforcement and increased hydrophobicity of the thermogelled and cross-linked hydrogel matrix.

As used herein, the term "macromonomer" should be interpreted, but not limited to mean a polymer or oligomer that has at least one reactive group, which enables the macromonomer to act as a monomer. Each macromonomer molecule may be attached to the main chain of the final polymer by the reaction of the reactive group in the macromonomer molecule. The term "chemical crosslinking" refers to covalent linkage of one polymer chain to another whereas the phrase "physical crosslinking" refers to the physical entanglement of polymer chains to cause gelation due to ionic and/or thermodynamic interactions.

The compositions and methods described in this disclosure may be useful for, among other things, cell encapsulation applications. In order to employ thermosensitive polymers for cell encapsulation applications, the materials should have a low gel temperature and the thermally aggregated polymer chains should retain a significant amount of water. Examples of polymers that meet these characteristics include, for example, copolyethers of poly(ethylene glycol) (PEG) and poly(propylene glycol), copolyesters of PEG and poly(lactic acid) or poly(propylene fumarate), homo- and copolymers of poly(organophosphazenes), and copolymers of poly(N-isopropylacrylamide) (PNiPAAm). The present disclosure is based in part on the observation that combining functional groups for chemical and physical gelation within a macromolecule in a way that polymer solutions physically gel in response to physiological temperature upon injection and that can be radically crosslinked at a slower kinetic in situ may yield superior materials with regard to gelation kinetics and ultimate mechanical properties. Accordingly, in certain embodiments, the compositions and methods of the present invention allow for control over hydrogel properties through the combination of two mechanistically and kinetically independent gelation techniques.

In certain embodiments, a macromonomer comprises a compound having the following formula:

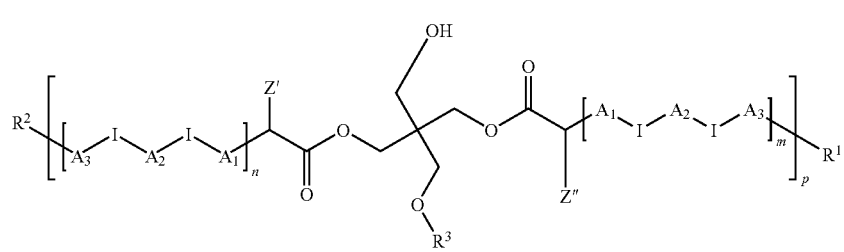

Formula 1 wherein R³ is a fatty acid group, $A_1$, $A_2$, and $A_3$ are each independently a thermo-responsive repeating unit, an ionic repeating unit, a hydrophilic repeating unit, or a hydroxy-containing repeating unit. $A_1$, $A_2$, and $A_3$ may be the same or different from one another. Any repeating unit of $A_1$, $A_2$, and $A_3$ may be the same or different from another repeating unit of $A_1$, $A_2$, and $A_3$. Z' and Z" may be the same or different and may comprise the repeating unit:

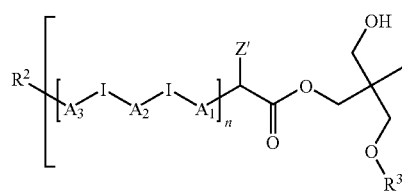

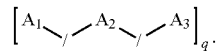

Z' and Z" also may comprise one or more pentaerythrityl esters. $R^1$ and $R^2$ may comprise vinyl groups. Likewise, $R^1$ and $R^2$ may be the same or different from one another. The subscripts "m" and "n" and "q" are integers representing a multiplicity of repeating units of $A_1$, $A_2$, and $A_3$. m and n and q may independently be 0, equal to 1, or greater than 1. In an embodiment, m and n and q may each independently be in a range of from 0 to 10, alternatively from 1 to 5, alternatively from 1 to 3. The subscript "p" in an integer representing the number of repeating units of the macromonomer. The "/" in the formula indicates that the sequence of $A_1$, $A_2$, and $A_3$ is random.

In certain embodiments, a macronomoner may be capable of thermogelation, ionic gelation, or both. Thermogelation may occur at a variety of temperatures depending on the amount and the composition of $A_1$, $A_2$, and $A_3$ incorporated in the macromonomer. As used herein, thermogelation is a property where a liquid compound becomes a solid (including an elastic gel) at specific temperature known as the lower critical transition temperature (LCST). Ionic gelation may occur in the presence of ions, such as calcium ions.

As can be seen in Formula 1 above, embodiments of the macromonomer incorporate at least one pentaerythritol ester as a branching or junction point for polymer branches comprising repeating units $A_1$, $A_2$, and $A_3$. In one embodiment the junction point is a pentaerythritol diester. The pentaerythritol ester junction point typically is coupled to at least one polymer of $A_1$, $A_2$, and $A_3$, more preferably at least two polymer branches of $A_1$, $A_2$, and $A_3$. That is, embodiments of the macromonomer may have a pentaerythritol ester junction point with one or more polymer branches of $A_1$, $A_2$, and $A_3$. The term "coupled" should be interpreted to mean, but not limited to a covalent bond, hydrogen bond, ionic bond, or electrostatic bond.

Typically, the polymers of $A_1$, $A_2$, and $A_3$ are random copolymers, when $A_1$, $A_2$, and $A_3$ are different from each other. In particular, the random copolymers may be statistical random copolymers, meaning that the repeating units are distributed according to a statistical distribution. However, in some embodiments, the copolymers of $A_1$, $A_2$, and $A_3$ may be block copolymers of $A_1$, $A_2$, and $A_3$. In further embodiments, $A_1$, $A_2$, and $A_3$ may all comprise the same repeating unit such that the one or more polymer branches are homopolymers (i.e. polymers comprising a single type of repeating unit). For example, $A_1$, $A_2$, and $A_3$ may all comprise isopropyl aminocarbonyl ethylene repeating units. Thus, in such an example, the one or more polymer branches are homopolymers of poly(N-isopropyl acrylamide).

In certain embodiments, the macromonomer may comprise more than one pentaerythritol ester branching point as shown below.

Figure 1:
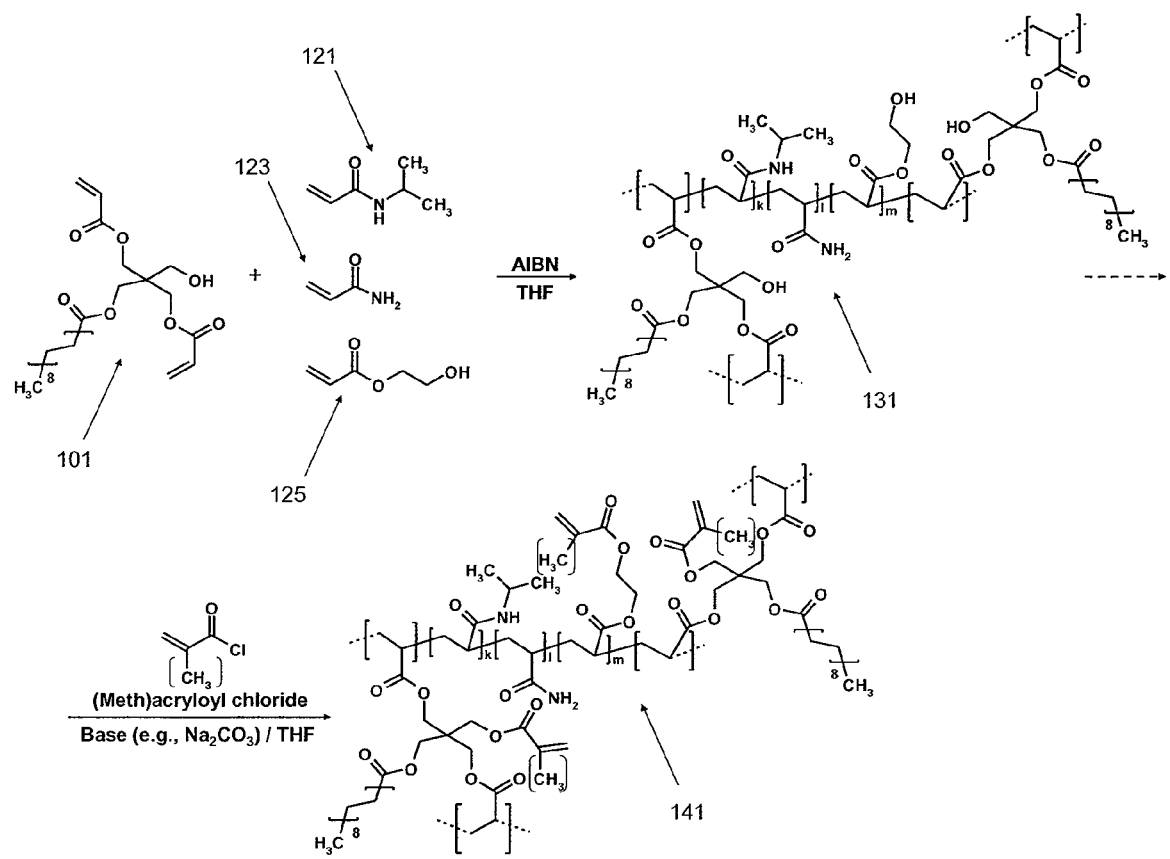
FIG. 1 illustrates a synthetic scheme for a thermogelling macromonomer (TGM) from the bi functional precursor pentaerythritol diacrylate monostearate (PEDAS) and the acrylic monomers N-isopropyl acrylamide (NiPAAm), acrylamide (AAm) and 2-hydroxyethyl acrylate (HEA) by addition copolymerization.

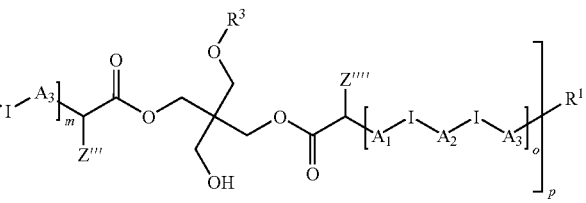

p may be equal to or greater than 1, for example p may be an integer ranging from 1 to 5, preferably from 1 to 3. The subscript "o", like subscripts "m" and "n" and "q" denote an integer multiplicity of repeating units, $A_1$, $A_2$, and $A_3$. o may be equal to or greater than 1, alternatively in a range of from 1 to 10, alternatively from 1 to 5, alternatively from 1 to 3. Where p is greater than 2, the macromonomer may comprise a branched structure 141 as shown in FIG. 1.

In certain embodiments, the macromonomer may have a number average molecular weight ranging from about 500 Mn to about 20,000 Mn, preferably ranging from about 1,000 Mn to about 10,000 Mn, more preferably from about 1,500 Mn to about 7,500 Mn. The molecular weight of the macromonomer may be varied by adjusting the initiator concentration or the initial concentration of $A_1$, $A_2$, and $A_3$ during the copolymerization described below. As shown in Formula 1, the polymer branches of $A_1$, $A_2$, and $A_3$ may each have m and n number of repeating units. Each polymer branch of $A_1$, $A_2$, and $A_3$ may have different molecular weights (i.e. different numbers of repeating units). The number of $A_1$, $A_2$, and $A_3$ repeating units incorporated into each copolymer branch may be varied by adjusting the initial concentration of each monomer used in the polymerization reaction.

According to one embodiment, $R^3$ may comprise a fatty acid group. $R^3$ serves to impart hydrophobicity to the macromonomer. As used herein, a fatty acid group is a functional group having a carboxyl group and a long chain aliphatic tail. The long chain aliphatic tail may be saturated or unsaturated. In addition, the long chain aliphatic tail may be branched or unbranched. In embodiments, the aliphatic tail may comprise from 2 carbons to 22 carbons, preferably from 8 carbons to 24 carbons, more preferably from 14 carbons to 20 carbons. Examples of suitable fatty acid groups include without limitation, a stearic group, a palmitic group, a myristic group, a lauric group, a capric group, a caprylic group, a caproic group, a butyric group, or their derivatives.

Embodiments of the macromonomer also comprise at least one polymer of the repeating units, $A_1$, $A_2$, and $A_3$ as shown in the formula above. $A_1$, $A_2$, and $A_3$ may comprise a thermo-responsive repeating unit. As used herein, a thermo-responsive repeating unit is any repeating unit when incorporated into a polymer or macromonomer imparts LCST behavior to the polymer or macromonomer. Examples of a thermo-responsive repeating unit include without limitation, an alkyl aminocarbonyl ethylene repeating unit, an alkyl aminocarbonyl alkylethylene repeating unit, an alkyl oxycarbonyl ethylene repeating unit, an alkyl oxycarbonyl alkylethylene repeating unit or an alkyloxy ethylene repeating unit.

In an embodiment, the thermo-responsive repeating unit has the following formula:

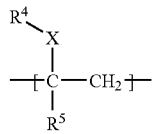

Formula 2 wherein $R^4$ comprises an alkyl group, X is an amide group (i.e. —(C=O)NH—), a carboxylate (i.e. —(C=O)O—) group, or an ether group (i.e., —O—), and $R^5$ is hydrogen or a methyl group. The alkyl group may be a branched or unbranched alkyl group having from 1 to 8 carbon atoms. However, the alkyl group may comprise any number of carbon atoms.

In a particular embodiment, the thermo-responsive repeating unit is an alkyl aminocarbonyl ethylene repeating unit. Examples of alkyl aminocarbonyl ethylene repeating units include without limitation, isopropyl aminocarbonyl ethylene, butyl aminocarbonyl ethylene, isobutyl aminocarbonyl ethylene, propyl aminocarbonyl ethylene, and the like. The alkyl aminocarbonyl ethylene repeating units may be derived from a number of different monomers such as without limitation, isopropyl acrylamide, isobutyl acrylamide, dimethyl acrylamide, etc.

In other embodiments, $A_1$, $A_2$, and $A_3$ may independently comprise an ionic repeating unit. As used herein, an ionic repeating unit is a repeating unit that has either a negative or positive charge. The ionic repeating unit generally comprises an acidic functional group. For example, in one embodiment, $A_1$ comprises a phosphono ethylene repeating unit (—(C—C—P(=O)(OH)$_2$)—). An ionic repeating unit provides a charge to the macromonomer, thus allowing gels to be formed from embodiments of the macromonomer by binding ions such as without limitation, calcium, magnesium, barium, strontium, or copper. This is known as ionic gelation. Thus, the incorporation of an ionic repeating unit imparts another mechanism by which the macromonomer may form a gel or a polymer network. Other examples of ionic repeating units include without limitation, a carboxy ethylene repeating unit, a carboxy alkylethylene repeating unit, a phosphonoxyethyloxycarbonyl methyl ethylene repeating unit, a sulfinoethylene repeating unit, a sulfoethylene repeating unit, other sulfo-, sulfino-, and phosphono-derived repeating units, a dicarboxy ethylene repeating unit, and similar α, β carboxy repeating units and α, β dicarboxy repeating units.

Each of $A_1$, $A_2$, and $A_3$ may independently comprise a hydrophilic repeating unit. As used herein, a hydrophilic repeating unit is any repeating unit known to those of skill in the art to increase water solubility of a polymer. The hydrophilic repeating unit may comprise a pyrrolidinone ethylene repeating unit, an oxyethylene repeating unit, a methoxy carbonyl ethylene repeating unit, or their derivatives. In an embodiment, the hydrophilic repeating unit is an unsubstituted aminocarbonyl ethylene repeating unit. In other words, using Formula 2 shown above, $R^4$ and $R^5$ are hydrogen atoms and X is an unsubstituted amide group. As used herein, the term unsubstituted refers to a functional group with no other substituents coupled to it. Without being limited by theory, the hydrophilic repeating unit may be used to increase or decrease the LCST of the macromonomer as well as imparting hydrophilicity to the macromonomer.

In an embodiment, $A_1$, $A_2$, and $A_3$ may independently comprise a hydroxy-containing repeating unit. As used herein, a hydroxy-containing repeating unit is any repeating unit having a pendant hydroxy functional group. The hydroxy-containing repeating unit may have the following formula.

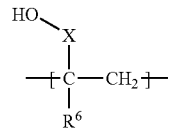

wherein $R^6$ comprises an alkyl group or a hydrogen, and X is an amide group, an alkyl carboxylate group, an alkyl group, or an ether group. Furthermore, X may comprise a branched or unbranched alkyl group having from 1 to 8 carbon atoms. However, the alkyl group may comprise any number of carbon atoms. Without being limited by theory, the hydroxy-containing repeating unit may provide further functional groups for polymerization or modification.

In an embodiment, the hydroxy-containing repeating unit is a hydroxyalkyl oxycarbonyl ethylene repeating unit. The hydroxyalkyl oxycarbonyl ethylene repeating unit may have the following formula:

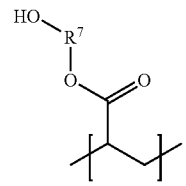

wherein $R^7$ comprises a branched or unbranched alkyl group. The alkyl group may have from 1 to 8 carbon atoms. Examples of hydroxyalkyloxycarbonyl ethylene repeating units include, for example, hydroxyethyloxycarbonyl ethylene, hydroxybutyloxycarbonyl ethylene, hydroxypropyloxy carbonyl ethylene, hydroxyethyloxycarbonyl methylethylene, hydroxymethyloxycarbonyl methylethylene, hydroxymethyloxy methylethylene, hydroxypoly(oxyethylene)oxycarbonyl ethylene, and the like. The hydroxy group in the hydroxyalkyloxy carbonyl ethylene repeating unit provides further functional groups to the macromonomer for vinyl group modification. In other embodiments, the hydroxy-containing repeating unit may comprise a hydroxyalkyl aminocarbonyl ethylene repeating unit, Referring to Formula 1, $R^1$ and $R^2$ each may comprise a vinyl group. As used herein, a vinyl group is any functional group containing a carbon-carbon double bond (—C=CH$_2$). $R^1$ and $R^2$ provide the ability for the macromonomer to be chemically crosslinked in addition to being physically crosslinked. In embodiments, $R^1$ and $R^2$ may comprise the same functional group or different functional groups. Examples of suitable vinyl groups include, for example, an acrylate group, a methacrylate group, a fumarate group, a cinnamoyl group, and the like.

As mentioned briefly above, embodiments of the macromonomer may possess several advantageous features and properties. Specifically, the macromonomer may be capable of both physical and chemical crosslinking. With respect to physical crosslinking, embodiments of the macromonomer exhibit thermogelation. That is, the macromonomer may physically crosslink with an increase in temperature. In other words, while soluble below a characteristic temperature, solutions of the macromonomers undergo thermally induced phase separation above their lower critical solution temperature (LCST). Without being limited to theory, it is believed that the phenomenon of polymer aggregation at LCST is an entropically driven process. Due to strong, specifically oriented hydrogen bonds, the entropy of the polymer solution is smaller than that of the two-phase polymer and water system. An increase in solution temperature renders the entropic contribution to overcome the positive enthalpy term and the free energy of association to become negative, thus favoring polymer desolvation and colloidal aggregation. This phase transition may lead to gel formation or polymer precipitation. Thus, in certain embodiments, the macromonomer may have a LCST ranging from about 0° C. to about 100° C., preferably from about 15° C. to about 60° C., more preferably from about 25° C. to about 40° C. In an embodiment, the macromonomer has an LCST less than or equal to the body temperature of a mammal (e.g., a human) such that the macromonomer forms a hydrogel in vivo after injection to the body.

Embodiments of the macromonomer may be crosslinked to form hydrogels useful for many different applications including biomedical, drug delivery, cell encapsulation, and tissue engineering applications. Hydrogels formed by the crosslinking of the macromonomers may comprise a variety of water contents depending on the initial concentration of macromonomers used. In embodiments, a hydrogel may be formed by the crosslinking of at least one of the disclosed macromonomers having an ionic repeating unit and at least one macromonomer having a thermo-responsive repeating unit. In further embodiments, hydrogels may be formed by the addition of one or more crosslinking agents to the macromonomers. As used herein, crosslinking agents are any compounds known to those of skill in the art which are capable of covalently linking polymer chains together. Examples of suitable crosslinking agents include acrylates, diacrylates, dimethacrylates, bisacrylamides, or combinations thereof. In a specific embodiment, the crosslinking agent may be a poly(ethylene glycol) (PEG) diacrylate or ethylene glycol diacrylate. The PEG diacrylate may be of any suitable molecular weight.

Hydrogels can be further engineered such that they contain calcium-binding domains. The content of calcium-binding domains, along with different gelation and crosslinking kinetics, calcium may modify the extent of in vivo cytocompatibility, mineralization, stability and degradation of the synthesized and purified hydrogels.

The mechanical stability of injectable hydrogels can be improved through the creation of strong cohesive forces between the polymer chains, such as with the addition of lipophilic domains. Crosslinked amphiphilic block copolymers of hydrophilic methoxy poly(ethylene glycol) and hydrophobic poly(propylene fumarate) (PPF), for example, are characterized by a higher mechanical stability than crosslinked oligo(poly(ethylene glycol) fumarate) (OPF) hydrogels. A decrease in hydrophilicity can also enhance cell-material interactions such as cell adhesion and spreading, which are potentially advantageous with regard to cell migration and matrix remodeling. Another strategy to increase the mechanical stability of injectable hydrogels involves the combination of independent gelation or crosslinking mechanisms. The mechanical stability of an injectable hydrogel system can be improved by including lipophilic domains and by combining chemical and physical gelation techniques.

Referring to FIG. 1, in an embodiment, a method of making a macromonomer comprises providing a precursor 101 comprising a pentaerythritol group coupled to at least one fatty acid and at least one vinyl group. The fatty acid group may comprise any functional group as described above for $R^3$. In an embodiment, the pentaerythritol group is coupled to at least two vinyl groups. Preferably, the pentaerythritol group is coupled to two acrylate groups. The precursor 101 may be dissolved in a solvent such as without limitation, tetrahydrofuran (THF) or any other suitable solvent.

In at least one embodiment, the precursor 101 is polymerized with one or more monomers 121, 123, 125 to form a macromonomer intermediate 131. The one or more monomers may include a first monomer 121, a second monomer 123, and a third monomer 125. However, in some embodiments, more than three monomers may be used. The concentration ratio of precursor 101 to the one or more monomers may be about 1:5 to about 1:50, preferably about 1:10 to about 1:30, more preferably about 1:20. Nevertheless, the concentration ratio of precursor 101 to monomers may comprise any suitable ratio.

The first monomer 121 may be a thermo-responsive monomer. As used herein, thermo-responsive monomers are compounds that polymerize to form compounds with LCST behavior. In an embodiment, the thermo-responsive monomer is an alkyl acrylamide. As mentioned previously above, examples of alkyl acrylamide monomers that may be copolymerized with the precursor include without limitation, isopropyl acrylamide, isobutyl acrylamide, dimethyl acrylamide, etc. Furthermore, the thermo-responsive monomer may comprise an alkyl methacrylamide, an alkyl acrylate, an alkyl methacrylate, an alkyl vinylimidazole, a vinyl alkyl ether, or their derivatives.

In addition, the first monomer 121 may be an ionic monomer. As used herein, an ionic monomer may be a monomer with charged or ionic groups. Ionic monomers may be polymerized to form polymers with charged or ionic groups. Examples of ionic monomers that may be copolymerized with the precursor include without limitation, acrylic acid, methacrylic acid, vinylsulfonic acid, vinylphosphonic acid, maleic acid, fumaric acid, itaconic acid, mesaconic acid, citraconic acid, ethylene glycol methacrylate phosphate, and similar $\alpha, \beta$ unsaturated carboxylic acids and $\alpha, \beta$ dicarboxylic acids.

The second monomer 123 is generally a hydrophilic monomer. The concentration of the second monomer 123 may be adjusted to control the LCST of the macromonomer and also to impart hydrophilicity (i.e. water solubility) to the macromonomer. Examples of hydrophilic monomers include, for example, unsubstituted acrylamide, methyl methacrylate, methoxy ethylene glycol acrylate, oligo(ethylene glycol) monomethyl ether acrylate, oligo(ethylene glycol) monomethyl ether methacrylate, N-vinyl pyrrolidinone, propylene oxide, ethylene oxide, and their derivatives.

The third monomer 125 may comprise a hydroxy-containing monomer such as without limitation, a hydroxyalkyl acrylate monomer. A hydroxy-containing monomer, as used herein, is any monomer when polymerized contains a hydroxy pendant group. Examples of hydroxyalkyl acrylate monomers which may be copolymerized with the precursor include without limitation, hydroxyethyl acrylate (HEA), hydroxybutyl acrylate, hydroxypropyl acrylate, hydroxyethyl methacrylate, hydroxymethyl acrylate, hydroxymethyl methacrylate, etc. In additional embodiments, the hydroxy-containing monomer may comprise a hydroxyalkyl methacrylate, a hydroxyalkyl acrylamide, a vinyl alcohol, or their derivatives.

Figure 2:
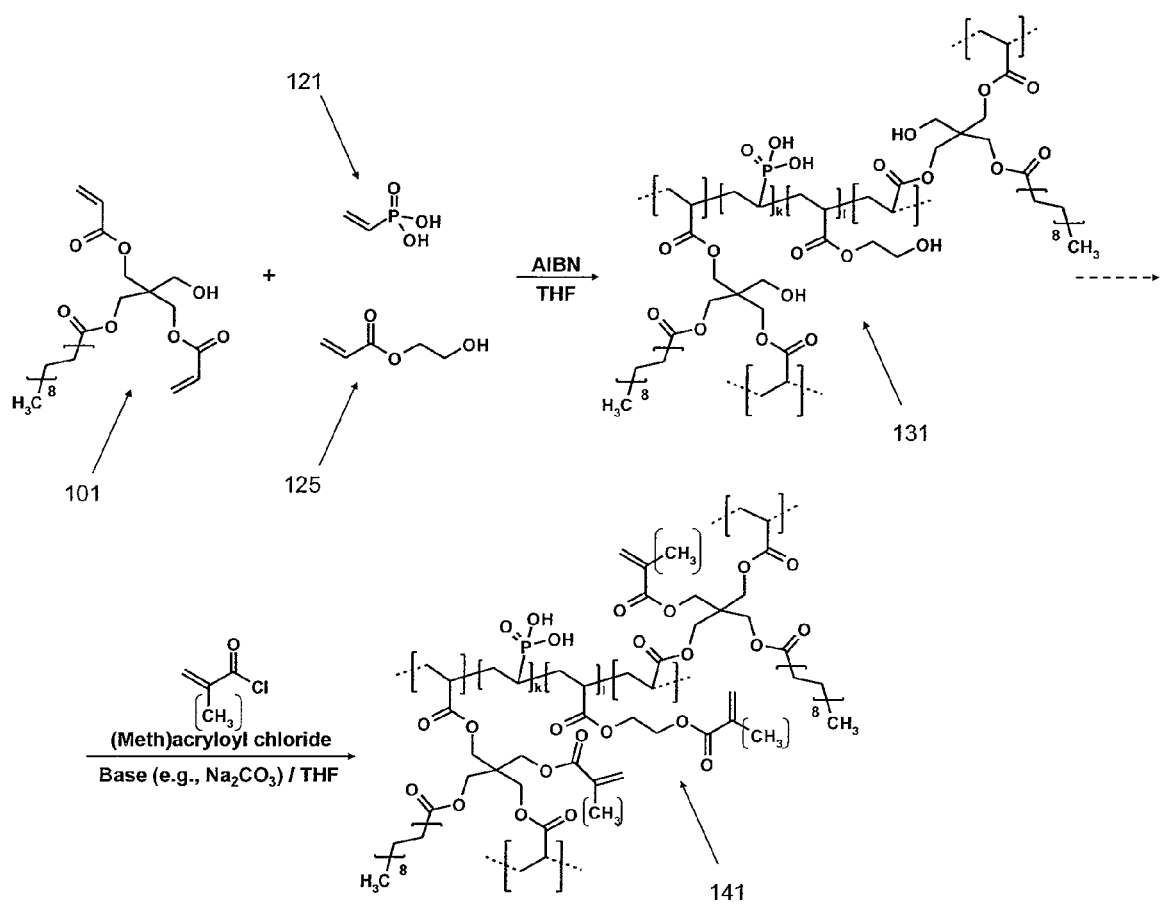
FIG. 2 illustrates a synthetic scheme for a calcium-binding macromonomer (CBM) from the bifunctional monomer PEDAS, the vinyl phosphonic acid monomer (VPA) and the acrylic monomer HEA by addition copolymerization.

In embodiments, the precursor 101 may be polymerized with any combination of the monomers described above. For example, as shown in FIG. 2, the precursor 101 may be polymerized with only the first 121 and third 125 monomers. In particular, the precursor 101 may be polymerized with an ionic monomer 121 (e.g., VPA) and a hydroxy-containing monomer 125 (e.g., HEA) to form a macromonomer with only ionic gelation properties. In addition, the precursor may be polymerized with just the first monomer i.e. only a thermoresponsive monomer or only an ionic monomer. In one embodiment as shown in FIG. 1, the first monomer 121 is NiPAAm, the second monomer 123 is AAm, and the third monomer 125 is HEA. In an additional embodiment, it is contemplated that the macromonomer may comprise an ionic monomer and a thermo-responsive monomer. In such an embodiment, the macromonomer may possess both ionic gelation and thermal gelation properties in a single composition. Thus, an advantage of the disclosed macromonomers is the ability to finely tailor their properties through the incorporation of different types of monomers.

In general, the precursor is polymerized with the monomers by radical polymerization. Specifically, an initiator is added to a solution of the precursor and the monomers. Examples of suitable initiators include without limitation, benzoyl peroxide, ammonium persulfate, hydrogen peroxide, potassium persulfate, photoinitiators, azobisisobutyronitrile (AIBN), azobis(cyclohexanecarbonitrile) (ABCN), or combinations thereof. However, any radical initiators known to those of skill in the art may be used. Polymerizing the monomers with the precursor forms the macromonomer intermediate.

The precursor and monomers may be copolymerized at raised temperatures. In embodiments, the precursor and the monomers may be copolymerized at a temperature ranging from about 20° C. to about 120° C., preferably from about 40° C. to about 80° C., more preferably from about 50° C. to about 70° C. The number of repeating units of each type of monomer incorporated into the macromonomer may be adjusted by altering the concentration ratio of each monomer during copolymerization. In embodiments, the concentration ratio of the first monomer to second monomer to third monomer may be from about 20:0:0 to about 7:7:6, preferably about from about 18:2:2 to about 10:5:5, more preferably about 14:3:3. However, the concentration ratio of monomers may be adjusted to any value according to the desired application.

Referring back to FIG. 1, once the macromonomer intermediate 131 has been synthesized, one or more vinyl groups may be coupled to the macromonomer intermediate 131 to form the macromonomer 141. In an embodiment, coupling at least one vinyl group to the macromonomer intermediate involves adding (meth)acryloyl chloride to a solution containing the macromonomer intermediate as shown in FIG. 1. The solution may comprise a concentration of the macromonomer intermediate dissolved in an organic solvent and a base. In an embodiment, the base is sodium carbonate ($Na_2CO_3$). Other compounds which may be used to modify the macromonomer intermediate include without limitation, glycidyl methacrylate, methacryoyl chloride, cinnamyl chloride, fumaryl chloride, maleic anhydride, fumaric anhydride, acrylic anhydride, or methacrylic anhydride.

In an embodiment, a method of making a hydrogel comprises forming a solution of the disclosed macromonomers. To form the solution, an amount of macromonomer may be dissolved in a liquid such as water. In an embodiment, an amount of macromonomer may be dissolved in a commercial available culture medium such as without limitation, minimum essential media (MEM). An initiator may be added to the solution to initiate the chemical crosslinking reaction. Examples of suitable initiators include without limitation, peroxides, persulfates, azo compounds, halogen compounds, and the like. In particular, the initiator may be a water soluble redox initiation pair such as without limitation, ammonium persulfate (APS) and tetramethylethylenediamine (TMED). However, any water soluble redox initiators known to those of skill in the art may be used to initiate the crosslinking reaction. Alternatively, the hydrogel may be crosslinked via photo-crosslinking using ultra-violet (UV) light and a photoinitiator. In further embodiments, the hydrogel may be crosslinked via the addition of one or more crosslinking agents, as described above.

To form the crosslinked hydrogel, the macromonomer solution may be heated to the LCST of the macromonomer to cause physical gelation or crosslinking. The heating may also cause chemical crosslinking by initiating the free radical chain reaction by the formation of free radicals from the initiator.

To further illustrate various illustrative embodiments of the present invention, the following examples are provided.

EXAMPLES

Materials. Pentaerythritol diacrylate monostearate (PEDAS), octadecyl acrylate (ODA), N-isopropylacrylamide (NiPAAm), poly(NiPAAm) (PNiPAAm), acrylamide (AAm), 2-hydroxyethyl acrylate (HEA), 2,2'-azobis(2-methylpropionitrile) (azobisisobutyronitrile, AIBN), acryloyl chloride (AcCl), methacryloyl chloride (MACl), anhydrous sodium carbonate, 4-methoxyphenol, ammonium persulfate (APS), and N,N,N',N'-tetramethylethane-1,2-diamine (TEMED) were purchased from Sigma-Aldrich (Sigma, St. Louis, Mo.) and used as received. The solvents, tetrahydrofuran (THF), diethyl ether, and acetone, were obtained from Fisher Scientific (Pittsburgh, Pa.) in analytical grade and were used as received unless stated differently. THF, used during macromer (meth)acrylation, was dried by refluxing over a potassium/sodium alloy for 3 days under nitrogen and distilled prior to use.

Macromonomer Synthesis: Statistical copolymers were synthesized from PEDAS, NiPAAm, AAm, and HEA using free radical polymerization (FIG. 1). Thermogelling macromers (TGMs) of various compositions were obtained by dissolving the acrylic monomers at corresponding molar comonomer ratios in THF at 60° C. under nitrogen and initiating polymerization through the addition of AIBN (1.5 mol %). In a typical experiment, 3 g of PEDAS and corresponding amounts of comonomers were dissolved in 250 mL of THF. The reaction was continuously stirred at 60° C. over 16-18 h and then refluxed for an additional 2 h while the nitrogen atmosphere was maintained. The product was isolated by rotoevaporation and precipitation in cold diethyl ether. The filtrate was dried, dissolved in THF for a second time, and again precipitated in diethyl ether. Precipitating the product in ether twice has been shown to be efficient to remove unreacted monomers and low molecular weight oligomers during method development. The final filtrate was vacuum-dried at ambient temperature and ground to a fine powder. Calcium-binding macromonomers were synthesized from PEDAS, VPA, AAm, NiPAAm, and HEA.

Macromer (Meth)acrylation: Methacrylated TGMs (TGM-MA) or acrylated TGMs (TGM-Ac) were obtained through the conversion of TGMs with MACl or AcCl in anhydrous THF in the presence of anhydrous sodium carbonate as scavenger for any acidic byproduct. In a typical reaction, 5 g of vacuum-dried TGM, 2.5 g of sodium carbonate, and approximately 120 mg of 4-methoxyphenol as radical inhibitor were weighed into a three-neck flask, which was subsequently purged with nitrogen and sealed against moisture. The nitrogen stream was maintained throughout the entire reaction. THF (75 mL) was added through a septum, and the polymer was dissolved under vigorous stirring. Thereafter, the reaction was chilled to below −10° C. using an ice-sodium chloride bath. As soon as the temperature dropped below −10° C., the (meth)acrylation agent (MACl or AcCl) was added dropwise by means of a plastic syringe with needle through the septum. This addition step was controlled by the reaction temperature which was maintained below −10° C. at any time. Following the addition of the (meth)acrylation agent, the mixture was stirred for another 16-18 h, during which the ice was allowed to melt and the mixture was warmed up to ambient temperature. The reaction mixture was filtered to remove any salt. Subsequently, the polymer solution was carefully concentrated by rotoevaporation, diluted with acetone, and again concentrated until almost dry. Enough acetone was added to redissolve the polymer. The solution was precipitated in cold diethyl ether. This step allows also for the removal of the radical inhibitor 4-methoxy phenol, which is soluble in diethyl ether. The (meth)acrylated TGM was isolated by vacuum filtration and finally dried under vacuum at ambient temperature Proton Nuclear Magnetic Resonance Spectroscopy (1H-NMR): $^1$H-NMR spectra were obtained using a 400 MHz spectrometer (Bruker, Switzerland). Sample materials were dissolved in CDCl$_3$ (typical concentration: 20 mg/mL) that contained 0.05% tetramethylsilane (TMS) as internal shift reference. All post-acquisition data processing was performed with the MestRe-C NMR software package (Mestrelab Research S.L., Spain). The free induction decay (FID) was Fourier transformed, manually phased, referenced using the TMS signal, baseline corrected, and integrated. To improve signal-to-noise, line broadening of 1.5 Hz was applied during transformation of the FID when meth(acrylated) TGMs were analyzed. To determine the comonomer composition of the macromers relative to PEDAS, the spectra were typically integrated between 0.85 and 0.94 ppm (I1), 0.95 and 1.24 ppm (I2), 1.25 and 1.34 ppm (I3), 1.35 and 2.45 ppm (I4), and 3.50 and 4.50 ppm (I5; FIG. 3). I3, which was attributed to 28 out of the 32 methylene protons of the stearate chain in PEDAS was set to 28. Consequently, I1, which represents the methyl protons in PEDAS, yielded values ranging between 2.8 and 3.4. It was found that the use of I3 instead of I1 as internal standard yielded more accurate results, because I3 comprises a higher number of protons. The relative molar contents of the comonomers NiPAAm, AAm, and HEA were calculated from the values obtained for I2, I4, and I5 according to the following equations: $I2=6 \cdot n_m(NiPAAm)$ (1); $I4=11+3 \cdot n_m(NiPAAm)+3 \cdot n_n(AAm)+3 \cdot n_o(HEA)$ (2); $I5=8+n_m(NiPAAm)+5 \cdot n_o(HEA)$ (3). Integral I2 comprises the six methyl protons of the N-isopropyl group of NiPAAm. I5 measures the methine proton of the latter functional group the eight methylene protons of the pentaerythrityl core in PEDAS, as well as the five protons of the hydroxyethyl residue of HEA. TGM conversion upon (meth)acrylation was also determined relative to PEDAS. The integral I3 (1.25-1.34 ppm) was set to equal 28 protons. The signals derived from the olefinic protons of the acrylate (typically 5.9, 6.2, and 6.5 ppm) or methacrylate groups (typically 5.6 and 6.15 ppm) were integrated individually, and the upfield signal (5.9 ppm (TGM-Ac) or 5.6 ppm (TGM-MA)) was quantified to obtain the degree of (meth)acrylation relative to PEDAS. The olefinic signals located further downfield often overlapped with the broad signal of the —NHR proton (6-7 ppm) of NiPAAm, which lead to falsely increased signal integrals.

Gel Permeation Chromatography (GPC): Molecular weight distributions of the different TGMs and (meth)acrylated TGMs were determined by GPC. A GPC system consisting of an HPLC pump (Waters, model 510, Milford, Mass.), an autosampler/injector (Waters, model 717), and a differential refractometer (Waters, model 410) equipped with a series of analytical columns (Styragel guard column 20 mm, 4.6×30 mm; Styragel HR3, 5 mm, 4.6×300 mm; Styragel HR1 column, 5 mm, 4.6×300 mm (all Waters)) was used with degassed chloroform (HPLC grade, Sigma) as the eluent at a flow rate of 0.3 mL/min. Samples were prepared in chloroform at a concentration of 25 mg/mL and filtered prior to analysis. Macromer number average molecular weight (Mn), weight average molecular weight (Mw), and polydispersity index (PI) were determined relative to polystyrene. Three samples of each material were prepared and analyzed.

Rheological Characterization: All rheological measurements were performed on a thermostatted oscillating rheometer (Rheolyst AR1000, TA Instruments, New Castle, Del.) equipped with a 6 cm steel cone (1 degree). TGMs were dissolved at the desired concentration (10% w/v), unless otherwise stated, in sterile minimum essential media (α modification; α-MEM; Sigma) and kept on an orbital shaker over 24 h at room temperature. In case the transition temperature of the macromer solution was below 25° C., samples were shaken in a cold room (4° C.) until the polymers were dissolved. The dynamic viscoelastic properties of the solutions, namely, the dynamic moduli, storage modulus (G') and loss modulus (G"), complex viscosity ($|\eta^*|$), and loss angle (δ), were recorded using the TA Rheology Advantage software (TA Instruments) at a gap size of 26 μm.

Gelation Properties and Transition Temperatures: In a typical experiment, TGM and control samples were loaded, cooled to 5° C., presheared at a rate of 1 s$^{-1}$ for 1 min, and equilibrated for 15 min at 5° C. The viscoelastic properties of the samples were then recorded during a temperature sweep from 5 to 65° C. at a rate of 1° C./min at an observing frequency of 1 Hz and a displacement of 1×10$^{-4}$ rad. To characterize the phase transition temperature of the TGM solution, different characteristic temperatures were determined. Upon thermogelation, different rheological properties show characteristic changes during the temperature sweep. The initial change in viscoelastic properties is characterized by an increase of G' over G", resulting in a decrease of the phase angle δ. $T_\delta$ characterizes the temperature at the first inflection point of the temperature-phase angle curve. During thermogel formation, the viscosity of the system increased notably. $T_\eta$ describes the location of the inflection point of the temperature-complex viscosity curve.

Reversibility of the Thermogelation: Samples were loaded, cooled to 10° C., presheared at a rate of 1 s$^{-1}$ for 1 min, and equilibrated for 5 min at 10° C. The viscoelastic properties of the samples were then recorded during a set of different steps with a solvent trap installed. To gel the samples, a temperature sweep from 10 to 37° C. was performed at a rate of 4° C./min with a frequency of 1 Hz and a displacement of 1×10$^{-4}$ rad (step I). The samples were kept at 37° C. for 2 min while maintaining frequency and displacement at 1 Hz and 1×10$^{-4}$ rad, respectively (step II). For the next 2 min at 37° C., the displacement was increased to 1.5×10$^{-3}$ rad (step III). Thereafter, the temperature setting was automatically changed to 15° C. and a time sweep was recorded over 90 min at a frequency of 1 Hz and a displacement of 1.5×10$^{-3}$ rad (step IV). In a typical experiment, the temperature had equilibrated at 15° C. after around 2.0 min into the time sweep. G' and |η*| were analyzed at 15° C. in step I, at the end of step II, and after 60 min during step IV.

Macromer Cross-Linking: The cone-plate setup described above, including a solvent trap, was used to compare the gelation properties of solutions from (meth)acrylated TGMs with and without chemical initiation. Solutions of different (meth)acrylated TGMs with a concentration of 10% (w/v) were prepared in α-MEM and loaded on the rheometer at 15° C. Before the geometry was lowered to gap size, TEMED and APS solution (100 mg/mL in water) were added to reach final concentrations of 20 mM each. In control samples without chemical initiation, equal amounts of TEMED and water were added. The samples were presheared at a rate of $1\ s^{-1}$ for 1 min at 15° C. before the viscoelastic properties were recorded in a two-step protocol. A temperature sweep from 15 to 37° C. was performed at a rate of 5° C./min with a frequency of 1 Hz and a displacement of $1 \times 10^{-4}$ rad (step I). Thereafter, the thermogel properties were monitored at 37° C. over 30 min while maintaining oscillation frequency and displacement (step II). For samples with a transition temperature below 20° C., the temperature sweep (step I) was started at 10° C. For sample comparison, the complex viscosities of the different samples were determined at 15° C. during step I and at the end of step II (30' at 37° C.).

Differential Scanning Calorimetry (DSC): The transition temperature of different TGM solutions was also determined by DSC. Solutions of different macromers (10%, w/v) were prepared in sterile α-MEM, as described for the rheology samples, and 20 µL were pipetted in an aluminum sample pan (TA Instruments, Newcastle, Del.) and capped. Thermograms were recorded on a TA Instruments DSC 2920 equipped with a refrigerated cooling system against an empty sealed pan as reference. In a typical run, the oven was equilibrated at 5° C. for 10 min and then heated to 80° C. at a heating rate of 5° C./min. For samples with a transition temperature below 20° C., the measurements were performed between −5 and 50° C. The transition temperature ($T_{DSC}$) of the TGM solution was determined as the "onset at inflection" of the endothermic peak in the thermogram using the Universal Analysis 2000 software provided with the DSC system. DSC has been shown to yield phase separation temperatures that are comparable to values obtained by optical cloud point measurements and UV turbidimetry, methods that are typically used to determine the LCST of a polymer solution. All DSC experiments were performed in triplicate.

Thermogel Stability: TGM solutions (10%, w/v) in α-MEM were prepared as described above and pipetted (450 µL) into glass vials that were capped airtight. The vials were placed in an incubator at 37° C. and analyzed after 2 and 24 h. Following macroscopic observation of the thermogels, any supernatant was removed carefully using a syringe with needle. The amount of aspirated solvent was determined gravimetrically on an analytical scale and recorded relative to the amount of media that could be removed from control vials that had been filled with 450 µL of plain α-MEM. The relative amount of supernatant represents a means to characterize the amount of syneresis of the corresponding thermogel.

Statistic: Unless otherwise stated, all experiments were conducted in triplicate, and the data were expressed as mean±standard deviation (SD). Single-factor analysis of variance (ANOVA) in conjunction with Tukey's post hoc test was performed to assess the statistical significance ($p<0.05$) within data sets.

Results. The resulting polymers were water-soluble at room temperature (PEDAS is typically insoluble in water). $^{1}$H-NMR spectroscopy of the TGMs showed typical signals of NiPAAm, HEA and PEDAS as shown in FIG. 3. The most prominent signals were obtained from the stearic acid of PEDAS (0.85 and 1.25 ppm) and the isopropyl group of NiPAAm (1.15 and 4 ppm) (FIG. 3). The signals between 1.6 and 2.2 ppm represent the polymerized C—C backbone. As verified from the quantification of NMR spectra, the theoretical monomer molar ratios are comparable to the actual molar analogies in the macromonomers, suggesting the successful incorporation of the monomers (Table 1).

TABLE 1

| | Theoretical composition | | | Actual comonomer feed [mol] (based on 1 mol PEDAS) | | | $^{1}$H-NMR results (based on 1 mol PEDAS) | | | GPC results | |
|---|---|---|---|---|---|---|---|---|---|---|---|
| | PEDAS: NiPAAm: AAm:HEA | | | NiPAAm:AAm: HEA | | | NiPAAm: AAm:HEA | | | Mn [Da] | PI |
| | | | | | | | | | | | |
| | | | | Effect of AAm content | | | | | | | |
| 1 | 20 | — | — | 20.0 | — | — | 20.7 | — | — | 2660 ± 130 | 3.4 ± 0.2 |
| 1 | 18.5 | 1.5 | — | 18.6 | 1.6 | — | 19.1 | 2.1 | — | 2450 ± 280 | 2.6 ± 0.2 |
| 1 | 18 | 2 | — | 18.0 | 2.0 | — | 18.9 | 2.4 | — | 1870 ± 130 | 2.5 ± 0.3 |
| 1 | 17 | 3 | — | 17.0 | 3.0 | — | 16.4 | 2.1 | — | 1860 ± 260 | 2.7 ± 0.2 |
| 1 | 16 | 4 | — | 16.0 | 4.1 | — | 13.3 | 4.2 | — | 1690 ± 80 | 2.7 ± 0.1 |
| 1 | 14 | 6 | — | 13.9 | 6.0 | — | 10.0 | 5.2 | — | 1470 ± 250 | 6.9 ± 2.1 |
| | | | | Effect of HEA content | | | | | | | |
| 1 | 16 | — | 4 | 15.9 | — | 4.0 | 17.5 | — | 5.8 | 3050 ± 140 | 2.9 ± 0.2 |
| 1 | 15.4 | 1 | 3.6 | 15.4 | 1.0 | 4.2 | 17.0 | 1.3 | 3.2 | 3810 ± 260 | 3.0 ± 0.3 |
| 1 | 15.4 | 2 | 2.6 | 15.3 | 2.0 | 2.6 | 17.4 | 1.8 | 2.0 | 2070 ± 90 | 2.7 ± 0.1 |
| 1 | 15.4 | 2.6 | 2 | 15.4 | 2.7 | 2.2 | 15.0 | 3.1 | 2.8 | 2030 ± 190 | 2.9 ± 0.2 |
| 1 | 15.4 | 3 | 1.6 | 15.1 | 3.0 | 1.9 | 14.0 | 4.0 | 0.9 | 1930 ± 120 | 2.9 ± 0.4 |
| 1 | 15 | 3.5 | 1.5 | 15.2 | 3.5 | 1.5 | 15.8 | 3.1 | 2.0 | 2110 ± 60 | 3.7 ± 0.6 |
| 1 | 14 | 3 | 3 | 14.0 | 3.0 | 3.0 | 15.2 | 2.0 | 3.4 | 2630 ± 200 | 2.9 ± 0.0 |
| 1 | 13.5 | 3.5 | 3 | 13.4 | 3.5 | 3.0 | 11.6 | 6.6 | 2.2 | 2770 ± 80 | 2.7 ± 0.2 |
| | Control (composition, comonomer feed and NMR data are based on 1 mol ODA) | | | | | | | | | | |
| ODA | 15.4 | 3 | 1.6 | 15.4 | 3.1 | 1.7 | 15.5 | 5.1 | 1.8 | 2450 ± 80 | 2.1 ± 0.0 |

Statistical copolymers of different comonomer ratios were synthesized from PEDAS, NiPAAm, AAm, and HEA in a free radical polymerization reaction initiated by AIBN in THF (FIG. 1). The main design criteria behind the amphiphilic NiPAAm-based macromers were the incorporation of a hydrophobic moiety to improve intermolecular cohesion and hydrogel mechanics in the long run, the introduction of hydrolytically labile bonds to foster macromer biodegradability, and the presence of thermoresponsive domains and of functional groups that can be modified to enable chemical cross-linking of the macromers. Hydrophobicity has been described as an important design criterion for polymers in bone tissue engineering. Hydrophobic domains also contribute to cell-biomaterial interactions and can improve the mechanical properties of a material. Lipids and fatty acids are hydrophobic building blocks that have become popular in biomaterial research due to their biocompatibility, metabolic elimination, and renewability. PEDAS was selected as a hydrophobic building block as it contains the natural fatty acid stearic acid. Further components of PEDAS are the biocompatible alcohol pentaerythritol and two acrylic moieties that allow for the incorporation of PEDAS in copolymers synthesized by radical polymerization. The ester functionalities in PEDAS are potentially prone to hydrolysis. Other polymeric pentaerythritol esters have shown reasonable tissue compatibility and biodegradation. PEDAS, therefore, was intended to function as a hydrophobic acrylic building block that mediates degradability to the copolymers. NiPAAm served as a well-established building block for thermoresponsive polymers. PNiPAAm is characterized by a LCST around 32° C. and is known to show extensive phase separation at higher temperatures. To form stable hydrogels, NiPAAm has been copolymerized with hydrophilic comonomers or cross-linked. Because copolymerization with the hydrophobic comonomer PEDAS would decrease the transition temperature, AAm was selected as a nonionic, hydrophilic acrylic monomer to compensate for the hydrophobic contribution of PEDAS and adjust the hydrophilic-hydrophobic balance of the resulting macromer. Through HEA, free hydroxyl groups can be introduced into the macromer that are available for chemical modification. Acrylation or methacrylation of the hydroxyl group would lead to cross-linkable macromers in which the (meth)acrylate functionalities are connected to the polymer backbone via hydrolyzable hydroxyethyl esters, a design that fosters degradability of the crosslinked hydrogels. Initial experiments identified THF as a more suitable solvent for the synthesis of uncross-linked low molecular weight macromers than toluene. The reaction protocol described in Materials and Methods yielded copolymers that remained dissolved in the reaction mixture without increasing its viscosity significantly. The copolymers were precipitated out in diethyl ether and a colorless water- and chloroform-soluble powder was obtained after vacuum drying at yields around 80-85%. Initial studies further identified a 1:20 ratio of bifunctional PEDAS to the monofunctional acrylic comonomers to yield copolymers of reproducible molecular weight and promising hydrophilic-hydrophobic balance. To establish the synthetic protocol and identify structure-property relations, terpolymers of PEDAS, NiPAAm, and AAm were first synthesized and characterized. Because PEDAS contains a free hydroxyl group, such terpolymers technically already fulfill the design criteria. Copolymers that contain HEA as a fourth comonomer were later synthesized with the objective to increase the number of free nucleophilic moieties for chemical modification. All copolymers are referred to with their theoretical comonomer composition throughout this study.

Statistical copolymers were synthesized from PEDAS, NiPAAm, and AAm with the content of hydrophilic AAm varying between 0 and 30% (Table 1). Qualitative $^1$H-NMR analysis of the purified polymers revealed the absence of any olefinic signals (5-7 ppm) from unreacted monomers (data not shown) and the presence of all characteristic signals derived from the copolymerized monomers (FIG. 3, trace a). Aliphatic signals derived from the stearic acid chain of PEDAS were found at 0.9 ppm (—CH$_3$, 3H, triplet) and around 1.3 ppm (—CH$_2$—, 28H, broad signal). The integral of the signal between 1.25 and 1.34 ppm was set to 28 and used as internal reference to calculate comonomer composition relative to PEDAS. Further signals were derived from the N-isopropyl group in NiPAAm and found at 1.15 ppm (—NH—CH(CH$_3$)$_2$) and 4 ppm (—NH—CH(CH$_3$)$_2$), and the methine and methylene groups of the polyacrylate backbone together with some functionalities in PEDAS between 1.4 and 2.4 ppm. The signals at 2.9 ppm (FIG. 3, trace a) and 2.5 ppm (trace b) were attributed to residual water. Due to interactions of the moisture with the macromer molecules in CDCl$_3$, the signal was found to vary in intensity and chemical shift dependent on macromer composition and concentration. With increasing AAm content and correspondingly decreasing NiPAAm content (Table 1), the relative signal intensities of the aliphatic signals at around 1.15 and 1.3 ppm accordingly shifted toward the signal at 1.3 ppm, indicating the varied comonomer composition in the copolymer (FIG. 4A). Quantitative analysis of the NMR spectra revealed that copolymers at the desired comonomer ratios could be synthesized with appropriate control (see Table 1).

With regard to the applicability of these macromers as injectable materials, control over macromer molecular weight and branching is critical, especially because PEDAS is a bifunctional monomer. The free radical polymerization protocol was optimized to allow for the synthesis of macromers that contain one to two PEDAS molecules and comprise the other comonomers at the feed ratio. In any case, the formation of branched, high molecular weight products should be avoided. Living radical polymerization techniques, such as group transfer polymerization (GTP) or reversible addition-fragmentation chain transfer (RAFT), may likely provide better control over macromer composition and molecular weight, but the requirements toward comonomer chemistry and purity (GTP) and catalyst chemistry (RAFT) are far more specific. When these techniques are used, a systematic screening of different comonomer compositions as presented here would involve laborious adaptation of the protocol to the different comonomer compositions. The versatility of a free radical polymerization protocol appeared advantageous for this study especially when control of macromer composition and weight can be achieved. GPC analysis of the PEDAS-NiPAAm-AAm terpolymers with AAm contents up to 20% revealed number average molecular weights ranging between 1690 and 2250 Da (Table 1). These values correlate well with theoretical molecular weights calculated for macromers that consist of one to two PEDAS precursors and the corresponding comonomers. The observed trend of decreasing molecular weights with increasing AAm and correspondingly decreasing NiPAAm content correlates with the difference in molecular weight between NiPAAm and AAm. Polydispersity indices between 2.3 and 2.7 were calculated. FIG. 5 shows representative chromatograms of different TGMs and precursors, as obtained by GPC in chloroform. The polymer chromatograms were free of monomer signals at around 25 min, the elution time of NiPAAm monomers (FIG. 5, trace a). PEDAS yielded a broad signal for which a PI of around 2 was determined (FIG. 5, trace b). The copolymer chromatograms were characterized by a broad signal with a significant tail (FIG. 5, traces c-e). As a similar shape was found for a control polymer containing ODA, a monofunctional lipophilic monomer, instead of the bifunctional PEDAS (FIG. 5, trace c), the broad distribution was not attributed to macromer branching but to the amphiphilic properties and resulting possible interactions with the chromatographic system. Extensive branching, indicated by a high molecular weight peak at low retention time (FIG. 5, trace f), was however observed for poly(PEDAS$_1$-stat-NiPAAm$_{14}$-stat-AAm$_6$), the terpolymers with the highest AAm content. Quantitative analysis consequently revealed a low Mn with a high PI of almost 7 (Table 1). Further studies revealed that macromer molecular weight and branching increased with increasing reactant concentrations and decreasing initiator concentration (data not shown). From the above-described results, one can conclude that good control over macromer architecture can be achieved with the established synthesis protocol for different comonomer compositions with AAm contents of up to 20%.

The thermogelation properties of solutions of the synthesized macromers (10%, w/v) were analyzed by oscillation rheology. It is known that thermally induced phase separation is strongly affected by solution pH and ionic strength. Therefore, cell culture medium (α-MEM) was used as solvent during these experiments to simulate physiological and in vitro cell culture conditions. FIG. 4 shows a typical rheogram of a TGM, here poly(PEDAS$_1$-stat-NiPAAm$_{15}$-stat-AAm$_{3.5}$-stat-HEA$_{1.5}$). The temperature-dependent profiles observed for the complex moduli G' (storage modulus) and G" (loss modulus), the complex viscosity |η*| and the phase angle δ are typical for thermogelling materials. At low temperatures, G" far exceeded G', which was indicated by a phase angle δ>>45°, a property characteristic of viscous liquids (FIG. 8). For temperatures below 25° C., the storage modulus of the displayed TGM was below the detection limit of the instrument. At temperatures below the phase transition, complex moduli and complex viscosity of the polymer solution decreased slightly with temperature, which is a typical behavior of viscoelastic polymer solutions. Upon further heating and thermogelation (here past 26° C.), G' and G" both increased drastically with G' finally exceeding G" (δ<45°), which indicated the formation of a viscoelastic hydrogel. The complex viscosity of the system increased by almost five orders of magnitude during this transition. Characteristic temperatures that were determined from the rheograms of different TGMs for sample comparison are the temperatures at the first inflection point of the temperature-phase angle curve (T$_δ$) and the inflection point of the temperature-complex viscosity curve (T$_η$). While T$_δ$ represents the onset of phase transition that is associated with colloidal aggregation of the macromers and clouding of the solution, T$_η$ depicts the temperature at which the molecules have aggregated into a coherent network and form a hydrogel. The transition temperatures determined for poly(PEDAS$_1$-stat-NiPAAm$_{20}$) and the different PEDAS-NiPAAm-AAm terpolymers are summarized in FIG. 7A. The figure also contains the transition temperatures as obtained by DSC (T$_{DSC}$) for the different TGM solutions (10%, w/v, in α-MEM). The characteristic temperatures determined for PNiPAAm are displayed in FIG. 7B, I. Almost identical transition temperatures T$_δ$ (27.4 (1.2° C.) and T$_η$ (27.4±1.3° C.) were obtained for PNiPAAm by rheology. DSC analysis yielded a transition temperature of 30.7±0.1° C. The discrepancy between the different temperatures likely has methodical reasons especially because T$_{DSC}$ is derived from a calorimetric signal and the other two temperatures are derived from viscoelastic parameters relevant for material application. Poly(PEDAS$_1$-stat-NiPAAm$_{20}$) was characterized by significantly lower values for T$_δ$ (25.7±0.1° C.) and T$_η$ (26.8±0.0° C.; FIG. 7A). T$_{DSC}$ (23.5±0.6° C.) confirmed the shift towards a lower phase transition temperature, which is caused by the hydrophobic structures in PEDAS. Increasing contents of the hydrophilic comonomer AAm in PEDAS-NiPAAm-AAm terpolymers compensated for the hydrophobic effect of PEDAS and the characteristic temperatures increased above the values of PNiPAAm. For poly-(PEDAS$_1$-stat-NiPAAm$_{14}$-stat-AAm$_6$), the terpolymer with the highest AAm content investigated, transition temperatures of 34.7±2.4° C. (T$_δ$), 43.5±2.3° C. (T$_η$), and 36.6±1.4° C. (T$_{DSC}$) were measured. A similar correlation between TGM composition and the different transition temperatures was found. For all TGMs a difference between T$_δ$ and T$_η$ was observed, which typically increased with AAm content. In comparison to pure PNiPAAm, for which identical values for T$_δ$ and T$_η$ were obtained, the TGMs are amphiphilic molecules and the formation of micellar aggregates is likely involved in the colloidal aggregation of the macromers during phase transition. Upon thermogelation the micelles aggregate and packing interactions increase to form dense gels. As the NiPAAm residues of the amphiphilic TGMs drastically change their interactions with solvent molecules during thermogelation, the hydrophilic-hydrophobic balance of the micelle-forming macromers is also altered significantly and micelle structure affected. Complex structural changes of the TGM solution are expected during thermogelation that involve micelle formation, aggregation, and vesicle shrinkage upon macromer dehydration. At this transition, T$_δ$ depicts the onset of colloidal aggregation and sol-gel transition, while T$_η$ describes the temperature at which the macromers finally assemble into a coherent physical network and a dense gel is formed. For hydrophobic monomers (systems with low phase transition temperatures), the calorimetric transition (T$_{DSC}$) appears to correlate with the onset of phase transition T$_δ$. With increasing hydrophilicity of the macromers, T$_{DSC}$ shifts closer towards T$_η$ (FIG. 7A,C). Because the different transition temperatures depend on solution concentration, trends between T$_{DSC}$, T$_δ$, and T$_η$ might differ at different concentrations. The relatively low T$_{DSC}$ observed for poly(PEDAS$_1$-stat-NiPAAm$_{14}$-stat-AAm$_6$) is likely attributed to the extensive branching of this macromer (FIG. 7A, Table 1).

TGMs synthesized using PEDAS as a lipophilic element (branching possible) and octadecyl acrylate (ODA) as a monofunctional lipophilic component were compared. Referring to FIG. 5, poly(PEDAS$_1$-stat-NiPAAm$_{15.4}$-stat-AAm$_3$-stat-HEA$_{1.6}$) (The numbers show theoretical molar monomer ratios in the macromonomer) (d) compared with TGMs synthesized using ODA (no branching, lipophilic domain comparable to PEDAS), poly(ODA$_1$-stat-NiPAAm$_{15.4}$-stat-AAm$_3$-stat-HEA$_{1.6}$) (c), showed similar MW distribution which demonstrates that TGMs containing PEDAS are not significantly branched. This can be also seen under Table 1 which also lists the molecular weights and polydispersity indices of the different TGM compositions. However, extensive branching occurred under certain conditions, e.g., high AAm feed, as shown in trace (f) (poly(PEDAS$_1$-stat-NiPAAm$_{14}$-stat-AAm$_6$)) and confirmed by molecular weight data (PI=5.2) as shown in Table 1. The asymmetrical peak shape and dispersity of the TGMs might in part be attributed to specific interactions of the lipophilic domains which might also be causing the broad trace that was found for the PEDAS monomer (b). Other acrylic monomers, here represented by NiPAAm (a), showed a narrow peak at high retention times. These results indicate that the macromonomers may be branched, however their branching does not affect their solubility in water.

Different TGMs were synthesized by substituting different amounts of NiPAAm with acrylamide (AAm) and/or 2-hydroxyethyl acrylate (HEA) and varying their ratios. Solutions of the different TGMs in α-MEM were prepared and analyzed using an oscillating rheometer to determine their LCST and the changes in dynamic moduli (G', G"), complex viscosity, and loss angle (δ). A representative rheogram is depicted in FIG. 6(A) comparing a TGM and a polyNiPAAM control. FIG. 6(B) shows values of complex viscosity |η*| as determined at 15° C., during step I (15° C.), after 2 min at 37° C., and after 60 min into step IV at 15° C.;

FIG. 7 depicts the phase transition temperature of TGMs as determined by rheology and differential scanning calorimetry. For TGMs synthesized from PEDAS, NiPAAm and AAm, a linear correlation was found between the acrylamide content of the macromonomer and the onset temperature of the phase transition (FIG. 7(A)). Increased substitution with HEA yielded TGMs with decreasing transition temperatures (FIG. 7(C)). A formulation with 15% molar AAm and 15% HEA (molar ratios PEDAS:NiPAAm:AAm:HEA 1:14:3:3) was found to have a transition close to physiologic temperature (FIG. 7(D)). Macroscopic observation of different macromonomer formulations at 37° C. revealed gel formation within 30 min; the 14:3:3 formulation formed a gel that was stable for 2 hours at 37° C. with minimal syneresis as compared to other synthetic compositions (FIG. 9).

Due to thermodynamic instability, PNiPAAm-based thermogels show considerable syneresis and possibly full phase separation when the temperature is increased above the phase-transition temperature. With regard to biomedical applications, it has been shown that the extent of phase separation correlates with the difference between transition temperature, commonly the LCST, and 37° C. To test for the thermodynamic stability of thermogels formed by the different TGMs, solutions (10%, w/v) were incubated at a constant temperature of 37° C., and the extent of syneresis was determined after 1, 2, and 24 hours. The results from the 2 hour time point are summarized in FIG. 9A, which depicts the gross view of the thermogels after 2 hours at 37° C. The residual gel mass is summarized in part B (FIG. 9). The solutions were prepared and pipetted into glass vials at ambient temperature below the transition temperature of the TGM solution. In a typical experiment thermogel formation occurred approximately 10 minutes after the vials were placed into the incubator. Immediately after gelation, the gel volume equaled the volume of the polymer solution (450 μL). After 24 hours, the residual gel fractions of all thermogels ranged around 10-15%, which was assumed to correlate with full syneresis and phase separation. In accordance with the literature, PNiPAAm solutions (FIG. 9, sample a) show extensive syneresis and phase separation at 37° C. Solutions of poly(PEDAS$_1$-stat-NiPAAm$_{20}$), which gelled at a lower temperature then PNiPAAm, shrunk to a comparable extent after 2 hours (sample b). With increasing AAm content, improved stability was observed for PEDAS-NiPAAm-AAm terpolymers (samples c and d) with poly(PEDAS$_1$-stat-NiPAAm$_{16}$-stat-AAm$_4$) forming stable thermogels at 37° C. for 2 hours (sample d). Solutions of poly(PEDAS$_1$-stat-NiPAAm$_{14}$-stat-AAm$_6$) (Tη=43.5±2.3° C.) did not gel at 37° C.; correspondingly, no gel fraction could be quantified after 2 hours (sample e).

These results show that amphiphilic terpolymers were synthesized with controlled molecular composition and structure. TGM structure, especially the hydrophobic-hydrophilic balance, controlled the thermally-induced gelation of corresponding aqueous macromer solutions. The thermodynamic stability of the resulting thermogels correlated with transition temperature. With regard to the intended chemical modification of the macromers, initial tests revealed that the free hydroxyl group in PEDAS (FIG. 1) was not sufficiently accessible for (meth)acrylation reaction, possibly due to steric hindrance (data not shown). To incorporate additional hydroxyl groups, HEA was introduced as comonomer and initially copolymerized with PEDAS and NiPAAm. HEA is known as a hydrophilic monomer and was therefore considered as a building block that could provide chemically accessible hydroxyl groups in combination with a potential to balance the hydrophobicity of PEDAS and control the transition temperature of the macromers. Analogous to the synthesis of poly(PEDAS$_1$-stat-NiPAAm$_{16}$-stat-AAm$_4$), poly (PEDAS$_1$-stat-NiPAAm$_{16}$-stat-HEA$_4$) was synthesized at the desired composition and molecular weight (Table 1). Analysis of the transition temperatures revealed values below 25° C. for $T_δ$, $T_η$, and $T_{DSC}$ (FIG. 7B, II). As a result of intra- or intermolecular hydrogen bond formation, the hydroxyl group of HEA did not fully interact with water, and the expected hydrophilic effect of HEA was diminished in solution. Correspondingly, extensive syneresis was observed for the corresponding thermogels (FIG. 9, sample h). Consequently, copolymers of PEDAS, NiPAAm, AAm, and HEA were synthesized for further experiments. The molar ratio of PEDAS to NiPAAm+AAm+HEA was maintained at 1:20.

Copolymers containing 1 mol PEDAS, 15.4 mol NiPAAm, and varying ratios of AAm and HEA (poly(PEDAS$_1$-stat-NiPAAm$_{15.4}$-stat-AAm$_m$-stat-HEA$_n$)) were synthesized at the desired composition and molecular weight distribution (Table 1, FIG. 5). A trend between molecular weight and HEA content as a result of the molecular weight difference of AAm and HEA was observed. $^1$H-NMR analysis confirmed the presence of HEA specific protons in the copolymers (l, h, and m in FIG. 3, trace b). The intensities of these signals were found to increase relative to the methine signal (4.0 ppm) of the N-isopropyl group of NiPAAm with increasing comonomer contents of HEA (FIG. 4B). FIG. 5 compares the molecular weight distribution of poly(PEDAS$_1$-stat-NiPAAm$_{15.4}$-stat-AAm$_3$-stat-HEA$_{1.6}$) (trace d) and poly(ODA$_1$-stat-NiPAAm$_{15.4}$-stat-AAm$_3$-stat-HEA$_{1.6}$) (trace c). This comparison was motivated by the concern of network formation due to the use of the bifunctional monomer PEDAS. ODA is a monofunctional monomer comprising stearic alcohol and acrylic acid, making the lipophilic component comparable to the stearic acid domain in PEDAS. The results illustrate that the molecular weight distributions of the different macromers do not differ significantly, which indicates that PEDAS-containing TGMs are most likely branched but not networked and still contain individual macromers of controllable molecular weight (Mn) in the range of 2000-3500 Da (FIG. 5, Table 1). Despite its bifunctionality, PEDAS is considered advantageous over ODA because the lipophilic domain of PEDAS, stearic acid, can be metabolized following ester hydrolysis in contrast to stearic alcohol. Comparison of the transition temperatures of both copolymers (FIG. 7; B, III vs C, data set on far left), revealed significantly higher values for poly(PEDAS$_1$-stat-NiPAAm$_{15.4}$-stat-AAm$_3$-stat-HEA$_{1.6}$), which likely indicates that the hydrophilic pentaerythrityl core of PEDAS positively affects the hydrophobic-hydrophilic balance within the macromer. Within the set of poly(PEDAS$_1$-stat-NiPAAm$_{15.4}$-stat-AAm$_m$-stat-HEA$_n$) copolymers, the transition temperatures follow the structure-property relations established in PEDAS-NiPAAm-AAm terpolymers (FIG. 7C). With increasing HEA and decreasing AAm contents, the transition temperatures decrease. $T_{DSC}$ again approaches $T_\delta$ with increasing hydrophobicity of the TGMs. In correlation with the transition temperatures, the thermogel stability of poly(PEDAS$_1$-stat-NiPAAm$_{15.4}$-stat-AAm$_m$-stat-HEA$_n$) copolymers at 37° C. decreased with increasing n/m ratio (FIG. 9, samples f and g).

Figure 6:
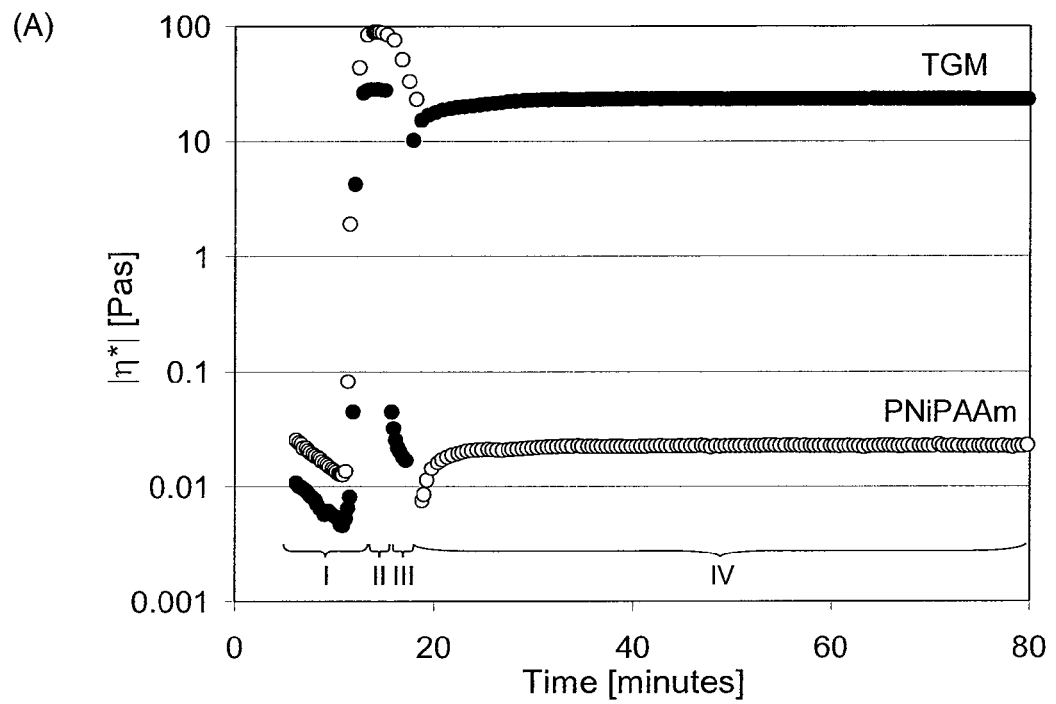
Figure 6:
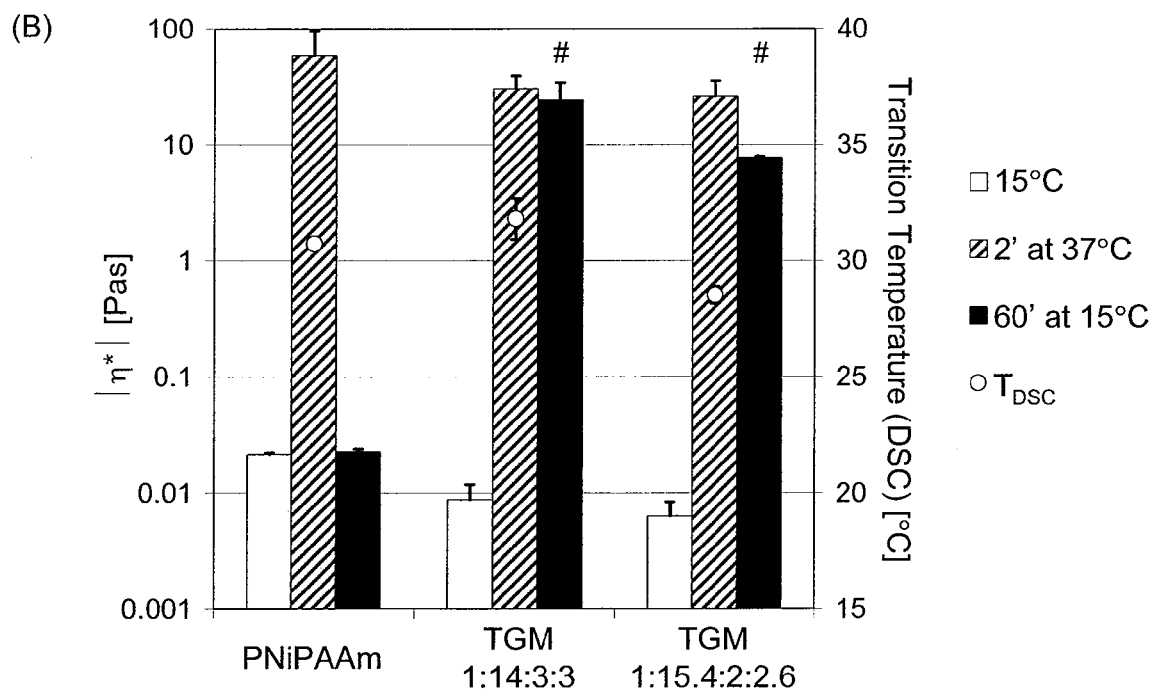

The TGMs were designed to contain hydrophobic domains to promote disperse interactions among the macromers and potentially increase mechanical stability of a TGM-based hydrogel. With regard to the thermogelation properties, these domains necessitated the incorporation of hydrophilic domains to adjust transition temperature and thermodynamic stability of thermally gelled TGM solutions. To test for any effects of the resulting amphiphilic design on the stability of corresponding thermogels, rheological experiments investigating the reversibility of the physical gelation were performed with PNiPAAm as control polymer (FIG. 6). Two TGMs, poly(PEDAS$_1$-stat-NiPAAm$_{14}$-stat-AAm$_3$-stat-HEA$_3$) and poly(PEDAS$_1$-stat-NiPAAm$_{15.4}$-stat-AAm$_2$-stat-HEA$_{2.6}$), with calorimetric transition temperatures ($T_{DSC}$) surrounding the value determined for PNiPAAm were selected considering the structure-property relation established for TGM hydrogels. Comparison of PNiPAAm with the two TGMs that were characterized by comparable transition temperatures revealed significant differences for the gel-sol transition upon cooling below transition temperature. During the rheometric experiment, the macromers were first gelled during a controlled temperature sweep to 37° C. After an isothermal phase of 2 min, the shear stress was increased and maintained for another 2 min before the temperature was set to 15° C. and changes in the complex viscosity were monitored (FIG. 6). All systems underwent thermogelation upon heating to 37° C., which was associated with an increase in complex viscosity by 3-4 orders of magnitude. The PNiPAAm solution showed the highest complex viscosity during step I and step II. This can likely be attributed to the higher molecular weight of the PNiPAAm (Mn of 20-25 kDa according to manufacturer) as compared to the TGMs. In response to the temperature decrease to 15° C., the PNiPAAm system degelled almost instantly into a solution with a complex viscosity as at the start of the experiment. Both TGM hydrogels, in contrast, maintained a significantly elevated complex viscosity for 60 min at 15° C., while the systems became translucent once the temperature dropped below the transition temperature. Macroscopic observations revealed the full reversibility of the thermogelation for the TGM gels after 2-3 days at 20° C. and below. This indicates that during thermally induced gelation of amphiphilic NiPAAm-based macromers colloids are formed, which are stabilized by additional intermolecular forces than those arising from the entropically driven aggregation of PNiPAAm domains. PNiPAAm-based amphiphiles appear advantageous over pure PNiPAAm hydrogels when increased hydrogel stability is warranted, and the kinetics of the gel-sol transition is of minor importance.

In view of the established structure-property correlations and the design objective to optimize the thermodynamic stability of the TGMs and to provide a sufficient number of hydroxyl groups available for chemical modification per macromer, TGMs with high AAm and HEA contents and reduced NiPAAm comonomer contents were synthesized and analyzed (Table 1). Poly(PEDAS$_1$-stat-NiPAAm$_{14}$-stat-AAm$_3$-stat-HEA$_3$) could be synthesized at the desired composition and molecular weight. The NMR analysis of poly (PEDAS$_1$-stat-NiPAAm$_{13.5}$-stat-AAm$_{3.5}$-stat-HEA$_3$) revealed overly high AAm contents and low NiPAAm contents, a phenomenon also observed for poly(PEDAS$_1$-stat-NiPAAm$_{14}$-stat-AAm$_6$). These findings are attributed to likely colloid formation of these strongly amphiphilic macromers in the NMR solvent CDCl$_3$ and shielding of PEDAS and NiPAAm protons. Increased branching was observed for poly(PEDAS$_1$-stat-NiPAAm$_{15}$-stat-AAm$_{3.5}$-stat-HEA$_{1.5}$), which was designed to contain half of the HEA compared to poly(PEDAS$_1$-stat-NiPAAm$_{14}$-stat-AAm$_3$-stat-HEA$_3$) and keep the molar AAm comonomer content below 4 (relative to PEDAS). Poly(PEDAS$_1$-stat-NiPAAm$_{14}$-stat-AAm$_3$-stat-HEA$_3$) solutions were characterized by a $T_\eta$ of 33.7±0.2° C. more than 5° C. above the $T_\eta$ determined for PNiPAAm (FIGS. 7D,IV and 7B,I). The stability of thermogels formed from this TGM were also significantly increased (FIG. 9, sample i). A further increase in AAm content resulted in a TGM (poly(PEDAS$_1$-stat-NiPAAm$_{13.5}$-stat-AAm$_{3.5}$-stat-HEA$_3$)) that yielded even more stable thermogels (FIG. 9, sample k). The chemical characteristics of the macromers, however, were less definite (Table 1), which explains the disperse results obtained for $T_\delta$, $T_\eta$, and $T_{DSC}$ (FIG. 5D,V). Another well-balanced TGM was synthesized with poly(PEDAS$_1$-stat-NiPAAm$_{15}$-stat-AAm$_{3.5}$-stat-HEA$_{1.5}$), which was characterized by $T_\delta$ and $T_\eta$, comparable to poly(PEDAS$_1$-stat-NiPAAm$_{14}$-stat-AAm$_3$-stat-HEA$_3$), but a significantly increased $T_{DSC}$ (35.6±0.5° C.; FIG. 7C, VI) and formed thermogels of appropriate stability (FIG. 9, sample l). In view of their favorable thermogelation properties, poly (PEDAS$_1$-stat-NiPAAm$_{14}$-stat-AAm$_3$-stat-HEA$_3$) and poly (PEDAS$_1$-stat-NiPAAm$_{15}$-stat-AAm$_{3.5}$-stat-HEA$_{1.5}$) were chemically modified to yield chemically crosslinkable TGMs.

With the objective to introduce chemically crosslinkable domains into the TGMs to yield macromers that can be gelled both physically and chemically, TGMs were reacted with AcCl or MACl. Anhydrous sodium carbonate was used to scavenge any acidic byproduct during the reaction and upon termination any salt was removed by filtration Triethylamine, which is a commonly used base to catalyze such (meth) acrylation reactions, could not be effectively removed from the reaction products due to the lack of a suitable extraction solvent that would precipitate the amphiphilic macromers. As described for the hydroxyl group methacrylation of other molecules, the molar excess of the acrylation or methacrylation agent, AcCl or MACl, controlled the extent of hydroxyl group conversion (Table 2, FIG. 10). FIG. 10 shows representative $^1$H-NMR traces of poly(PEDAS$_1$-stat-NiPAAm$_{14}$-stat-AAm$_3$-stat-HEA$_3$) as well as two acrylated and one methacrylated derivative. Characteristic changes of the proton signal indicate successful (meth)acrylation of the TGM. Upon (meth)acrylation, characteristic olefinic proton signals appear between 5.6 and 6.6 ppm, representing three (TGM-Ac) or two (TGM-MA) olefinic protons per (meth)acrylic ester. In addition, a downfield shift of the methylene protons in α-position to the newly formed (meth)acrylic ester was observed (signal at 4.3 ppm). A signal at 1.9-2.0 ppm, representing the methyl group of the methacrylate ester group was found in the spectrum of TGM-MA. The conversion was calculated relative to the PEDAS molecules per TGM and an increased conversion was found with higher feeds of (meth) acryloyl chloride. Poly(PEDAS$_1$-stat-NiPAAm$_{14}$-stat-AAm$_3$-stat-HEA$_3$), the TGM with the higher HEA content per macromer, showed a higher conversion relative to PEDAS. A maximum of 1.25 acrylic groups per macromer subunit identified by one PEDAS block was achieved with an acryloyl chloride excess of 2.5 (relative to the theoretical number of hydroxyl groups per macromer subunit). This means that 1.25 out of the four theoretical hydroxyl groups per macromer subunit (three in HEA and one in PEDAS) were acrylated. Additional experiments revealed that the hydroxyl group of PEDAS was not accessible for (meth)acrylation under the applied conditions (data not shown). Due to the lower reactivity of methacrylic chloride, a likely consequence of steric limitations, a lower conversion was found for the methacrylated TGMs as compared to the acrylation products at corresponding molar feeds of the reactive chlorides (Table 2). The transition temperatures of the (meth)acrylated macromers, here $T_{DSC}$, were found to decrease with the extent of (meth)acrylation. As hydrophilic hydroxyl functionalities are turned into considerably less hydrophilic (meth)acrylic esters, the hydrophilic-hydrophobic balance of the macromer was changed toward increased hydrophobicity and the phase transition temperature decreased. A stronger effect of macromer derivatization on transition temperature was found for TGM-MA, which is explained by the stronger hydrophobicity of the methacrylic ester as compared to an acrylic ester.

the tested initiator concentration appears high. If slower crosslinking kinetics are desired to achieve successive thermogelation and chemical crosslinking, a lower initiator concentration would be recommended. Comparison of the complex viscosities after 30 min at 37° C. revealed a significant difference between the crosslinked macromers and the physically gelled systems (FIG. 11B,C). The viscosities determined for the highly acrylated poly(PEDAS$_1$-stat-NiPAAm$_{15}$-stat-AAm$_{3.5}$-stat-HEA$_{1.5}$) were comparable to those achieved for poly(PEDAS$_1$-stat-NiPAAm$_{14}$-stat-AAm$_3$-stat-HEA$_3$) acrylated using a low AcCl feed (0.75×). For this polymer higher acrylation rates could be achieved with AcCl feeds of 1.25× and 2.5× (Table 2), but the viscosity of gels cross-linked from these macromers was decreased likely due to extensive phase separation of these hydrophobic macromers at 37° C. (FIG. 11B). In general, high viscosities

TABLE 2

| TGM (PEDAS/NiPAAm/AAm/HEA) | | 1:14:3:3 | | 1:15:3.5:1.5 | |
|---|---|---|---|---|---|
| modification | reagent feed ($n_{XCl}/n_{OH}$) | $^1$H NMR ($n_{olefin}/n_{PEDAS}$) | $T_{DSC}$ [° C.] | $^1$H NMR ($n_{olefin}/n_{PEDAS}$) | $T_{DSC}$ [° C.] |
| unmodified | n/a | n/a | 33.1 ± 0.4 | n/a | 35.6 ± 0.5 |
| methacrylation | 1.25 | 0.55 | 13.6 ± 1.1 | 0.19 | 24.1 ± 0.6 |
|  | 2.5 | 1.12 | 13.8 ± 0.5 | 0.57 | 15.2 ± 0.9 |
| acrylation | 0.75 | 0.27 | 25.1 ± 0.6 | 0.15 | 31.2 ± 0.2 |
|  | 1.25 | 1.01 | 22.3 ± 1.2 | 0.64 | 24.6 ± 0.3 |
|  | 2.5 | 1.25 | 19.6 ± 0.7 | 0.98 | 20.8 ± 0.9 |

[a]Conversion of TGM hydroxyl groups into (methy)acrylate esters, as determmined by $^1$H-NMR per PEDAS molecule ($n_{olefin}/n_{PEDAS}$) and corresponding transition temperature of a 10% macromer solution as determined by DSC (n = 3).

Results of rheological experiments performed with solutions of the (meth)acrylated TGMs (10%, w/v) with and without the presence of the thermal initiator system APS/TEMED (25 mM each) are summarized in FIG. 11. Redox initiator system and concentration have been shown suitable and sufficiently biocompatible for direct cell encapsulation with in situ cross-linked hydrogels. All (meth)acrylated TGMs except acrylated (Ac 2.5×) poly(PEDAS$_1$-stat-NiPAAm$_{14}$-stat-AAm$_3$-stat-HEA$_3$) showed thermogelation during the initial temperature sweep to 37° C., which was associated with a significant increase in complex viscosity for samples with (APS/TEMED) and without (H$_2$O/TEMED) chemical initiation (FIG. 11A,B). Acrylated (2.5×) poly(PEDAS$_1$-stat-NiPAAm$_{14}$-stat-AAm$_3$-stat-HEA$_3$), which showed the highest degree of acrylation, had likely partially crosslinked during preparation of rheological samples. The high complex viscosity values determined for this sample at the beginning of the rheological experiment confirmed this assumption. For the other samples, low complex viscosities below 0.1 Pa·s were determined for the solutions at 15° C. and no significant differences were found between the APS containing samples and the control samples (H$_2$O/TEMED) at 15° C. (FIG. 11B, C). At 37° C., higher complex viscosity values were typically determined for initiated samples (APS/TEMED) compared to the noninitiated controls (FIG. 11A). During the subsequent time sweep at 37° C., the complex viscosity was monitored for 30 min at 37° C. While the APS/TEMED groups typically maintained the values for complex viscosity during this time, decreasing complex viscosity values due to the thermodynamic instability of the physical gels were recorded for the H$_2$O/TEMED groups. This result indicates thermally initiated cross-linking of the (meth)acrylated TGMs in the presence of APS/TEMED during the temperature sweep within a few minutes. Based on these findings that show that physical and chemical cross-linking occurred almost simultaneously, were reached by cross-linking the methacrylated macromers but their low transition temperatures significantly impair polymer processing with regard to biomedical applications. Macroscopically, the APS/TEMED systems remained as a coherent hydrogel film on the geometry upon disassembly of the rheometer, while the noninitiated samples resembled a highly viscous liquid. The crosslinking density and (meth)acrylate conversion of the crosslinked hydrogels could be determined by total hydrolysis of the gels and subsequent chromatographic analysis For all experiments, macromer solutions with a concentration of 10% (w/v) have been used. This concentration is comparably low with regard to other injectable hydrogels based on synthetic polymers such as poly(ethylene glycol), which typically range from 20-25%. The use of macromer concentrations higher than 10% is expected to yield TGM hydrogels with increased crosslinking densities.

Amphiphilic TGMs with controlled polymer architecture and low molecular weight (~2-3.5 kDa) were synthesized from PEDAS, NiPAAm, AAm, and HEA at different compositions, and selected macromers were subsequently (meth)acrylated to yield chemically crosslinkable thermogelling materials for biomedical applications. Structure-property correlations for nonmodified TGMs were established and the hydrophilic-hydrophobic balance was characterized as an important design criterion to adjust the gelation temperature of TGM solutions and thermodynamic stability of the resulting thermogels. The amphiphilic design was shown to support intermolecular interactions, a property which could improve the mechanical stability of crosslinked TGM-based gels. (Meth)acrylated TGMs were synthesized and the combination of thermogelation and thermally induced chemical crosslinking was shown to improve hydrogel stability. The experiments further suggest that degree of acrylation and hydrophilic-hydrophobic balance of the macromers have to be well-adjusted to yield hydrogels of optimal stability. The synthesis of chemically crosslinkable, thermogelling, and potentially biodegradable macromers was realized and promising macromers for the design of injectable drug and cell delivery systems with improved properties and stability are presented.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Therefore, the present invention is well adapted to attain the ends and advantages mentioned as well as those that are inherent therein. While numerous changes may be made by those skilled in the art, such changes are encompassed within the spirit of this invention as illustrated, in part, by the appended claims.

What is claimed is:

1. A macromonomer having the formula:

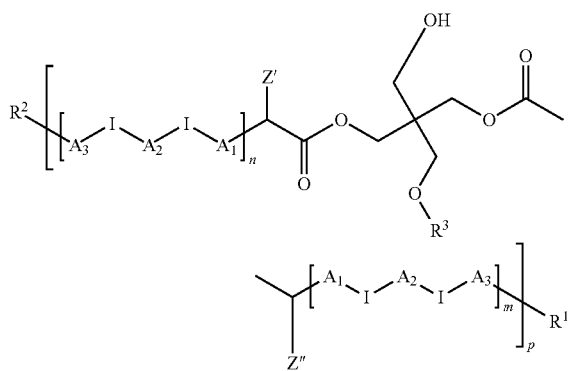

wherein $R^3$ is a fatty acid group,
wherein $A_1$, $A_2$, and $A_3$ are each independently a thermoresponsive repeating unit, a hydroxy-containing repeating unit, a hydrophilic repeating unit, or an ionic repeating unit;
wherein n is an integer in the range of 1 to 10;
wherein m is an integer in the range of 1 to 10;
wherein p is an integer in the range of 0 to 5;
wherein $R^1$ and $R^2$ each independently comprise a vinyl group; and
wherein Z' and Z" each independently comprise a pentaerythrityl ester, a repeating unit having the formula:

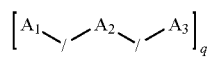

wherein q is an integer in the range of 1 to 10, or both.

2. The macromonomer of claim 1 wherein the fatty acid group contains from 2 to 22 carbon atoms.

3. The macromonomer of claim 1 wherein the fatty acid group comprises at least one selected from a group consisting of a stearic group, a palmitic group, a myristic group, a lauric group, a capric group, a caprylic group, a caproic group, and a butyric group.

4. The macromonomer of claim 1 wherein the fatty acid group is an unsaturated fatty acid group.

5. The macromonomer of claim 1 wherein the thermoresponsive repeating unit comprises at least one selected from a group consisting of an alkyl aminocarbonyl ethylene repeating unit, an alkyl aminocarbonyl alkylethylene repeating unit, an alkyl oxycarbonyl ethylene repeating unit, an alkyl oxycarbonyl alkylethylene repeating unit, and an alkyloxy ethylene repeating unit.

6. The macromonomer of claim 1 wherein the thermoresponsive repeating unit is an alkyl aminocarbonyl ethylene repeating unit and wherein the alkyl aminocarbonyl ethylene repeating unit comprises at least one selected from the group consisting of a butyl aminocarbonyl ethylene repeating unit, an isobutyl aminocarbonyl ethylene repeating unit, a propyl aminocarbonyl ethylene repeating unit, an isopropyl aminocarbonyl repeating unit, an ethyl aminocarbonyl ethylene repeating unit, and a methyl aminocarbonyl ethylene repeating unit.

7. The macromonomer of claim 1 wherein the thermoresponsive repeating unit comprises a repeating unit having the formula:

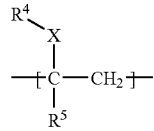

wherein $R^4$ comprises an alkyl group, X is an amide group, a carboxylate group, or an ether group, and $R^5$ is hydrogen or a methyl group.

8. The macromonomer of claim 1 wherein the hydroxy-containing repeating unit is a hydroxy-containing repeating unit having the formula:

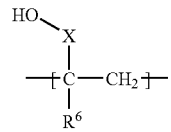

wherein $R^6$ comprises an alkyl group or a hydrogen, and X is an amide group, an alkyl carboxylate group, an alkyl group, or an alkyl ether group.

9. The macromonomer of claim 1 wherein the hydroxy-containing repeating unit is a hydroxyalkyloxycarbonyl ethylene repeating unit.

10. The macromonomer of claim 1 wherein the hydroxy-containing repeating unit is a hydroxyalkyloxycarbonyl ethylene repeating unit and wherein the hydroxyalkyloxycarbonyl ethylene repeating unit comprises at least one selected from the group consisting of a hydroxyethyloxycarbonyl ethylene repeating unit, a hydroxybutyloxycarbonyl ethylene repeating unit, a hydroxypropyloxycarbonyl ethylene repeating unit, hydroxyethyloxycarbonyl methylethylene repeating unit, a hydroxymethyloxycarbonyl methylethylene repeating unit, a hydroxypoly(oxyethylene)oxycarbonyl ethylene repeating unit, and a hydroxymethyloxy methylethylene repeating unit.

11. The macromonomer of claim 1 wherein the hydroxy-containing repeating unit is a hydroxyalkyloxycarbonyl ethylene repeating unit and wherein the hydroxy alkyloxy carbonyl ethylene repeating unit comprises a repeating unit having the formula:

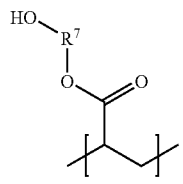

wherein $R^7$ comprises an alkyl group having from 1 to 8 carbon atoms.

12. The macromonomer of claim 1 wherein the ionic repeating unit comprises at least one selected from the group consisting of a carboxy ethylene repeating unit, a carboxy methylethylene repeating unit, a phosphonoxyethyloxycarbonyl methylethylene repeating unit, a carboxy alkyl ethylene repeating unit, a sulfoethylene repeating unit, a sulfinoethylene repeating unit, and a phosphonoethylene repeating unit.

13. The macromonomer of claim 1 wherein $A_1$ is a thermo-responsive repeating unit, and $A_2$ and $A_3$ are hydrophilic repeating units.

14. The macromonomer of claim 1 wherein $A_1$ is an ionic repeating unit, and $A_2$ and $A_3$ are hydroxy-containing repeating units.

15. The macromonomer of claim 1 wherein $R^1$ and $R^2$ comprise methacrylate or acrylate groups.

16. The macromonomer of claim 1 having a lower critical solution temperature ranging from about 0° C. to about 100° C.

17. The macromonomer of claim 1 having a number average molecular weight ranging from about 500 to about 15,000.

18. A hydrogel comprising one or more macromonomers having the formula:

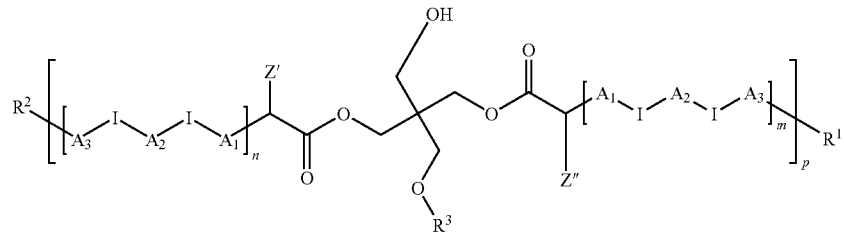

wherein $R^3$ is a fatty acid group, wherein $A_1$, $A_2$, and $A_3$ are each independently a thermo-responsive repeating unit, a hydroxy-containing repeating unit, a hydrophilic repeating unit, or an ionic repeating unit;

wherein n is an integer in the range of 1 to 10;

wherein m is an integer in the range of 1 to 10;

wherein p is an integer in the range of 1 to 5;

wherein $R^1$ and $R^2$ each independently comprise a vinyl group; and wherein Z' and Z" each independently comprise a pentaerythrityl ester, a repeating unit having the formula:

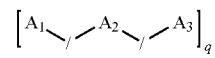

wherein q is an integer in the range of 1 to 10, or both.

19. The hydrogel of claim 18 comprising at least one macromonomer having an ionic repeating unit and at least one macromonomer having a thermo-responsive unit.

20. The hydrogel of claim 18, further comprising one or more crosslinking agents.

21. The hydrogel of claim 18, further comprising calcium.

22. A method comprising:

providing a precursor comprising a pentaerythritol group coupled to at least one fatty acid group and at least one vinyl group;

polymerizing the precursor with one or more monomers to form a macromonomer intermediate with one or more polymer branches, wherein the one or more monomers comprises at least selected from the group consisting of a thermo-responsive monomer and an ionic monomer; and coupling one or more vinyl groups to the macromonomer intermediate to make a macromonomer having the formula:

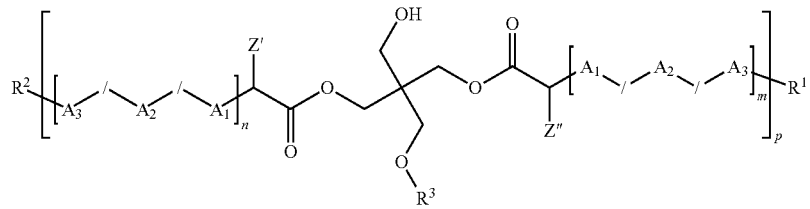

wherein R³ is a fatty acid group,
wherein A₁, A₂, and A₃ are each independently a thermo-responsive repeating unit, a hydroxy-containing repeating unit, a hydrophilic repeating unit, or an ionic repeating unit;
wherein n is an integer in the range of 1 to 10;
wherein m is an integer in the range of 1 to 10;
wherein p is an integer in the range of 1 to 5;
wherein R¹ and R² each independently comprise a vinyl group; and
wherein Z' and Z" each independently comprise a pentaerythrityl ester, a repeating unit having the formula:

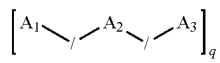

wherein q is an integer in the range of 1 to 10, or both.

23. The method of claim 22 wherein the at least one fatty acid group comprises at least one selected from the group consisting of a stearic group, a palmitic group, a myristic group, a lauric group, a capric group, a caprylic group, a caproic group, and a butyric group.

24. The method of claim 22 wherein the precursor comprises a pentaerythritol group coupled to two acrylate groups.

25. The method of claim 22 wherein the thermo-responsive monomer comprises at least one selected from the group consisting of an alkyl acrylamide, an alkyl methacrylamide, an alkyl acrylate, an alkyl methacrylate, an alkyl vinylimidazole, and a vinyl alkyl ether.

26. The method of claim 22 wherein the thermo-responsive monomer comprises at least one selected from the group consisting of isopropyl acrylamide, isobutyl acrylamide, and dimethyl acrylamide.

27. The method of claim 22 wherein the ionic monomer comprises at least one selected from the group consisting of acrylic acid, methacrylic acid, vinylsulfonic acid, maleic acid, fumaric acid, itaconic acid, mesaconic acid, citraconic acid, ethylene glycol methacrylic phosphate, vinylsulfonic acid, and vinylphosphonic acid.

28. The method of claim 22 wherein the one or more monomers further comprises a hydrophilic monomer.

29. The method of claim 22 wherein the one or more monomers further comprises a hydrophilic monomer and wherein the hydrophilic monomer comprises at least one selected from the group consisting of unsubstituted acrylamide, methyl methacrylate, methoxy ethylene glycol acrylate, oligo(ethylene glycol) monomethyl ether acrylate, oligo(ethylene glycol) monomethyl ether methacrylate, N-vinyl pyrrolidinone, propylene oxide, and ethylene oxide.

30. The method of claim 22 wherein the one or more monomers further comprises a hydroxy-containing monomer.

31. The method of claim 30 wherein the hydroxy-containing monomer comprises at least one selected from the group consisting of a hydroxy-containing monomer and wherein the hydroxy-containing monomer comprises a hydroxyalkyl acrylate, a hydroxyalkyl methacrylate, a hydroxyalkyl acrylamide, a poly(ethylene glycol) acrylate, and a vinyl alcohol.

32. The method of claim 31 wherein the hydroxy-containing monomer is a hydroxyalkyl (meth)acrylate selected from the group consising of a hydroxy-containing monomer and wherein the hydroxy-containing monomer at least one selected from the group consisting of a hydroxyalkyl acrylate and wherein hydroxyethyl acrylate, hydroxybutyl acrylate, hydroxypropyl acrylate, hydroxyethyl methacrylate, hydroxymethyl acrylate, and hydroxymethyl methacrylate.

33. The method of claim 22 wherein the one or more monomers further comprises a hydroxy-containing monomer and a hydrophilic monomer.

34. The method of claim 22 wherein polymerizing further comprises adding an initiator to initiate the polymerization reaction.

35. The method of claim 22 wherein polymerizing further comprises adding an initiator to initiate the polymerization reaction and wherein the initiator comprises at least one selected from the group consisting of a peroxide, a persulfate, an azo compound, and a redox initiator pair.

36. The method of claim 22 wherein polymerizing further comprises adding an initiator to initiate the polymerization reaction and wherein the initiator comprises at least one selected from the group consisting of a peroxide, a persulfate, an azo compound, and a redox initiator pair and wherein the initiator is a water soluble initiator.

37. The method of claim 22 wherein coupling comprises coupling acrylate or methacrylate groups to the macromonomer intermediate.

38. A method comprising:
providing one or more macromonomers having the formula:

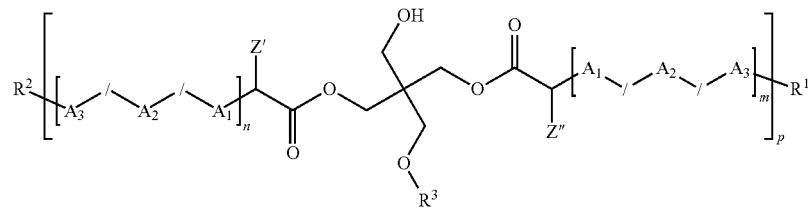

wherein $R^3$ is a fatty acid group, wherein $A_1$, $A_2$, and $A_3$ are each independently a thermo-responsive repeating unit, a hydroxy-containing repeating unit, a hydrophilic repeating unit, or an ionic repeating unit;

wherein n is an integer in the range of 1 to 10;

wherein m is an integer in the range of 1 to 10;

wherein p is an integer in the range of 1 to 5;

wherein $R^1$ and $R^2$ each independently comprise a vinyl group; and wherein Z' and Z'' each independently comprise a pentaerythrityl ester, a repeating unit having the formula:

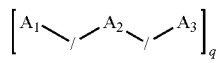

wherein q is an integer in the range of 0 to 10, or both; and crosslinking the one or more macromonomers.

39. The method of claim 38 wherein providing one or more macromonomers comprises dissolving the one or more macromonomers in a solvent to form a solution.

40. The method of claim 38 wherein providing one or more macromonomers comprises dissolving the one or more macromonomers in a solvent to form a solution and wherein the solvent comprises culture medium.

41. The method of claim 38 comprising at least one macromonomer having an ionic repeating unit and at least one macromonomer having a thermo-responsive repeating unit.

42. The method of claim 38 wherein crosslinking the one or more macromonomers comprises at least one selected from the group consisting of heating the one or more macromonomers to physically crosslink the one or more macromonomers by thermal gelation, adding ions to the one or more macromonomers to physically crosslink the one or more macromonomers by ionic gelation, and adding an initiator to the one or more macromonomers to chemically crosslink the one or more macromonomers.

43. The method of claim 38 wherein crosslinking the one or more macromonomers comprises at least one selected from the group consisting of heating the one or more macromonomers to physically crosslink the one more macromonomers by thermal gelation, adding ions to the one or more macromonomers to physically crosslink the one or more macromonomers by ionic gelation, and adding an initiator to the one or more macromonomers to chemically crosslink the one or more macromonomers and wherein the initiator comprises ammonium persulfate and N,N,N',N'-tetramethylethane-1,2-diamine.

44. The method of claim 38 wherein crosslinking the one or more macromonomers comprises heating the one or more macromonomers to a temperature of about 37° C.

45. The method of claim 38 wherein crosslinking the one or more macromonomers comprises providing one or more crosslinking agents to the macromonomers.

46. The method of claim 38 wherein crosslinking the one or more macromonomers comprises providing calcium to the macromonomers.

47. The method of claim 38 wherein crosslinking the one or more macromonomers comprises physical gelation, chemical gelation, or both.

* * * * *